(12) United States Patent
Maeto

(10) Patent No.: US 12,236,977 B2
(45) Date of Patent: *Feb. 25, 2025

(54) MAGNETIC DISK DEVICE AND DOL SETTING METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/484,139

(22) Filed: Oct. 10, 2023

(65) Prior Publication Data

US 2024/0038267 A1 Feb. 1, 2024

Related U.S. Application Data

(63) Continuation of application No. 17/888,255, filed on Aug. 15, 2022, now Pat. No. 11,817,123.

(30) Foreign Application Priority Data

Dec. 22, 2021 (JP) ................................ 2021-207845

(51) Int. Cl.
*G11B 20/18* (2006.01)
*G11B 5/09* (2006.01)
*G11B 20/12* (2006.01)

(52) U.S. Cl.
CPC ................. *G11B 20/12* (2013.01); *G11B 5/09* (2013.01); *G11B 2020/1222* (2013.01)

(58) Field of Classification Search
CPC ...................... G11B 20/12; G11B 5/09; G11B 2020/1222; G11B 20/1217; G11B 20/1876; G11B 20/1889; G11B 20/1833; G11B 20/1866; G11B 20/1258; G11B 2220/1222; G11B 2020/1232; G11B 5/58; G11B 2020/183; G11B 20/1816
USPC ........................................................ 360/77.12
See application file for complete search history.

(56) References Cited

U.S. PATENT DOCUMENTS

| 7,245,447 | B2 | 7/2007 | Zaitsu |
| 9,530,442 | B1* | 12/2016 | Hassner ........... G11B 20/10009 |
| 10,748,567 | B1 | 8/2020 | Zaitsu et al. |
| 10,910,013 | B1 | 2/2021 | Kawabe et al. |

* cited by examiner

*Primary Examiner* — Nabil Z Hindi
(74) *Attorney, Agent, or Firm* — Maier & Maier, PLLC

(57) ABSTRACT

According to one embodiment, a magnetic disk device including a disk, a head which writes data to the disk and reads data from the disk, and a controller which sets a first DOL for a first sector group and a second DOL for a second sector group to different values, the first sector group including one or more first sectors and a first parity sector, the first sectors which allow an error correction process to be performed for each track based on the first parity sector, and are continuously arranged in a circumferential direction of the disk from the first parity sector, the second sector group including one or more second sectors which allow no error correction process to be performed for each track, and are continuously arranged in the circumferential direction.

8 Claims, 16 Drawing Sheets

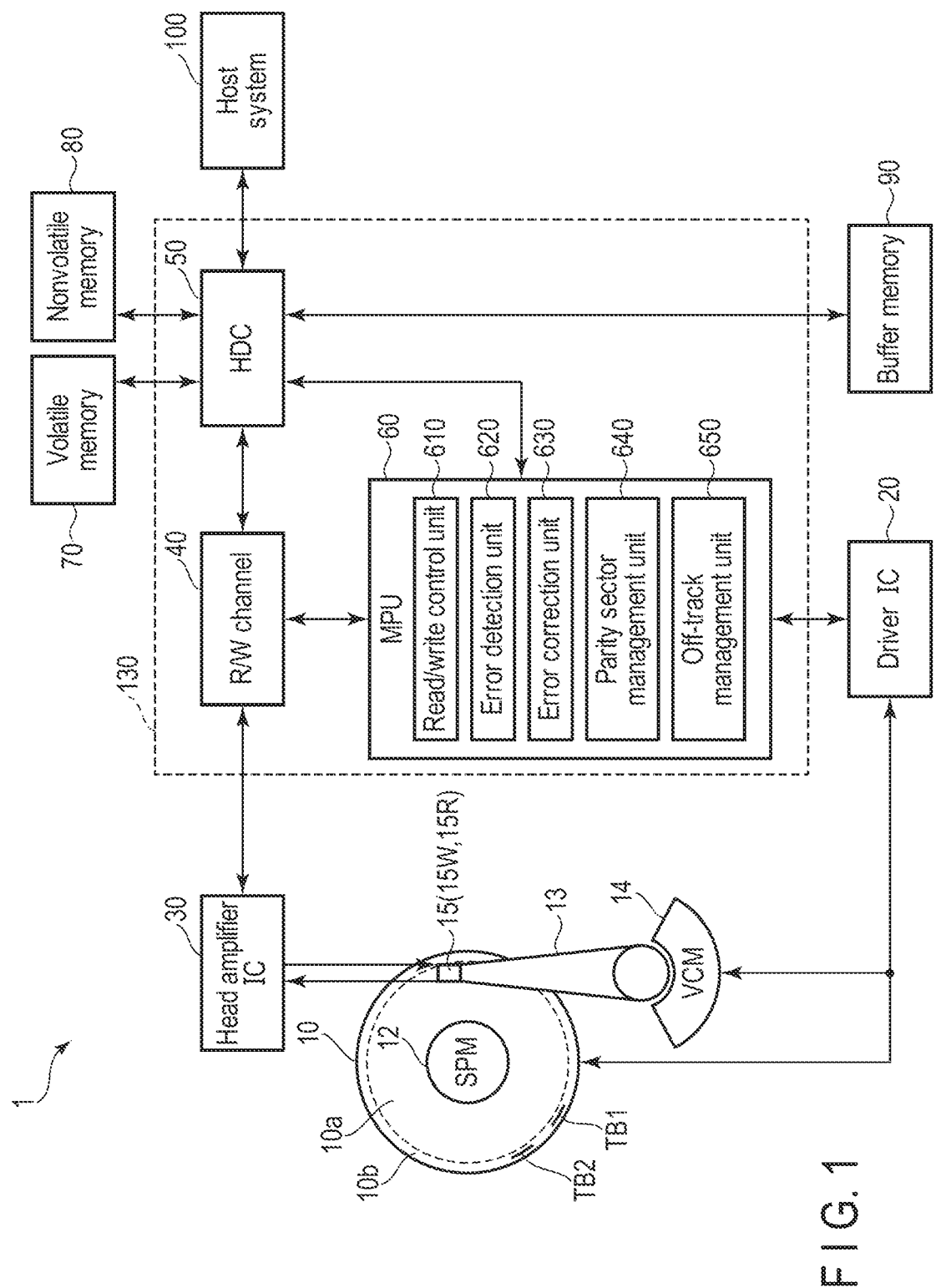
F I G. 1

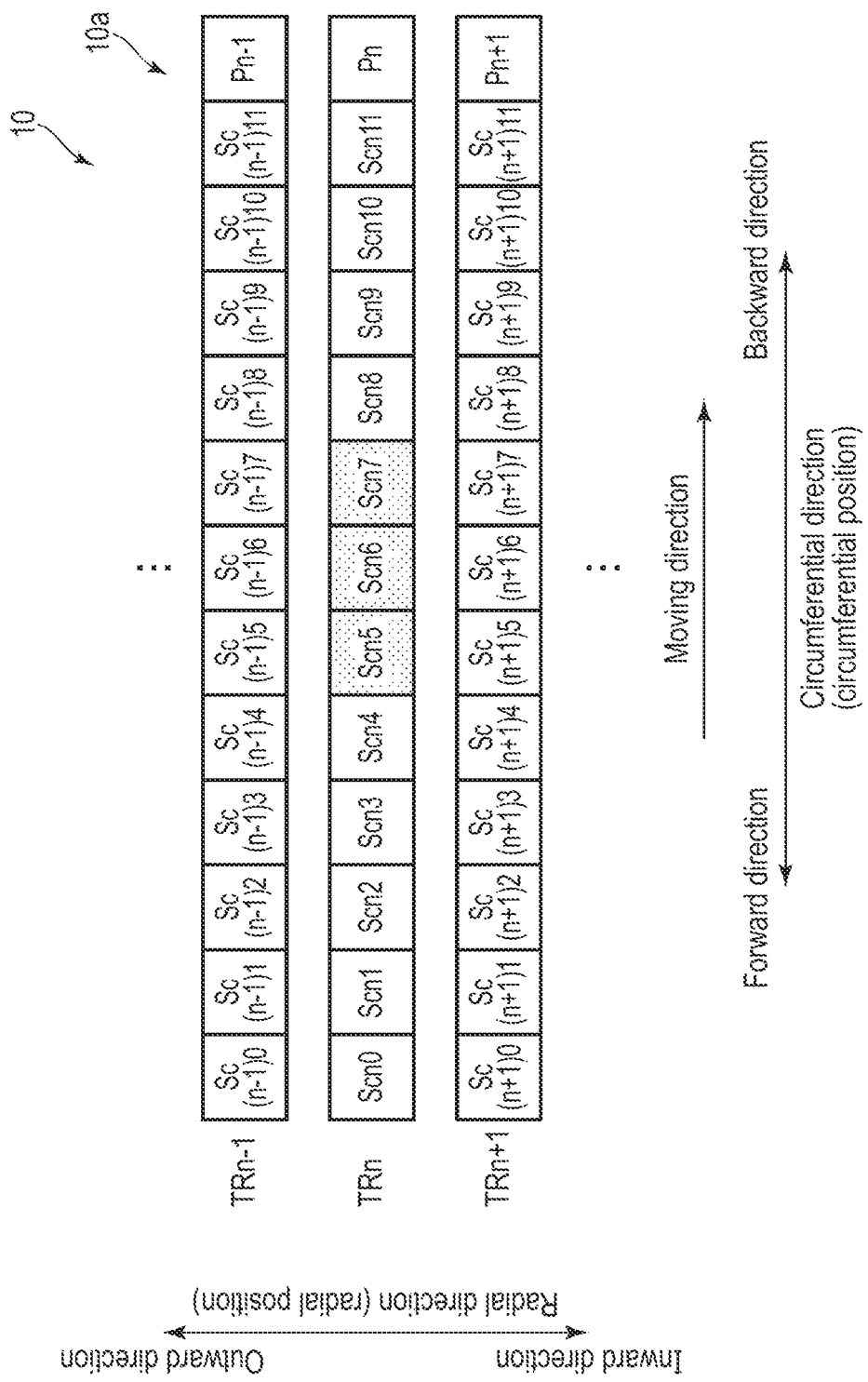
F I G. 4

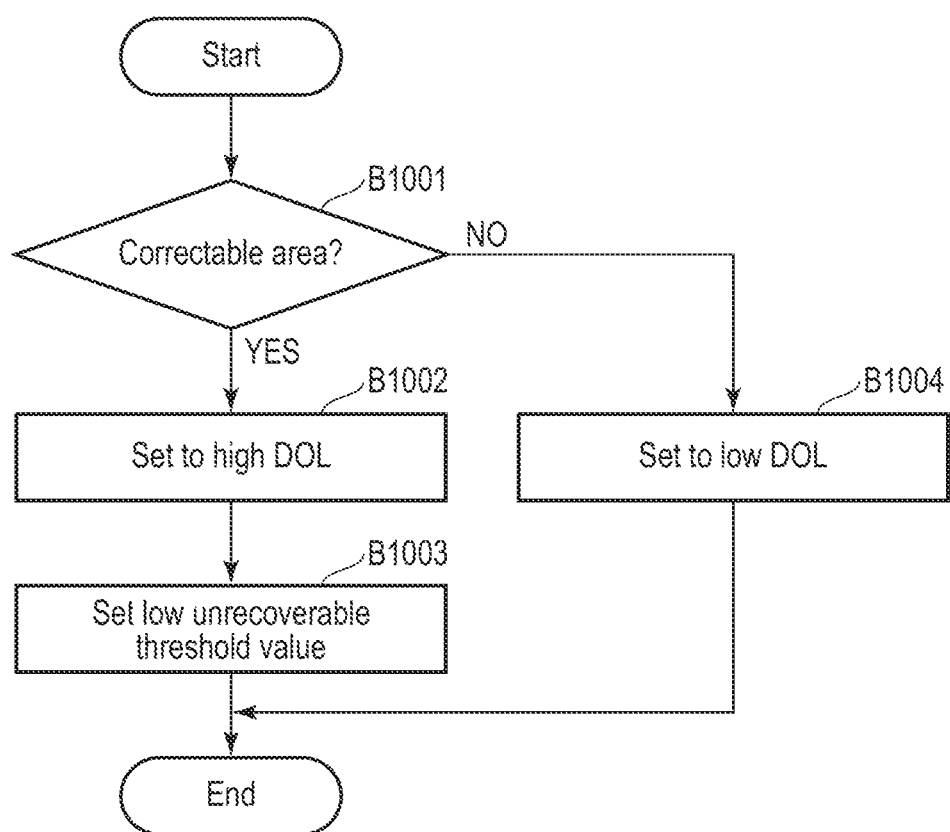
F I G. 10

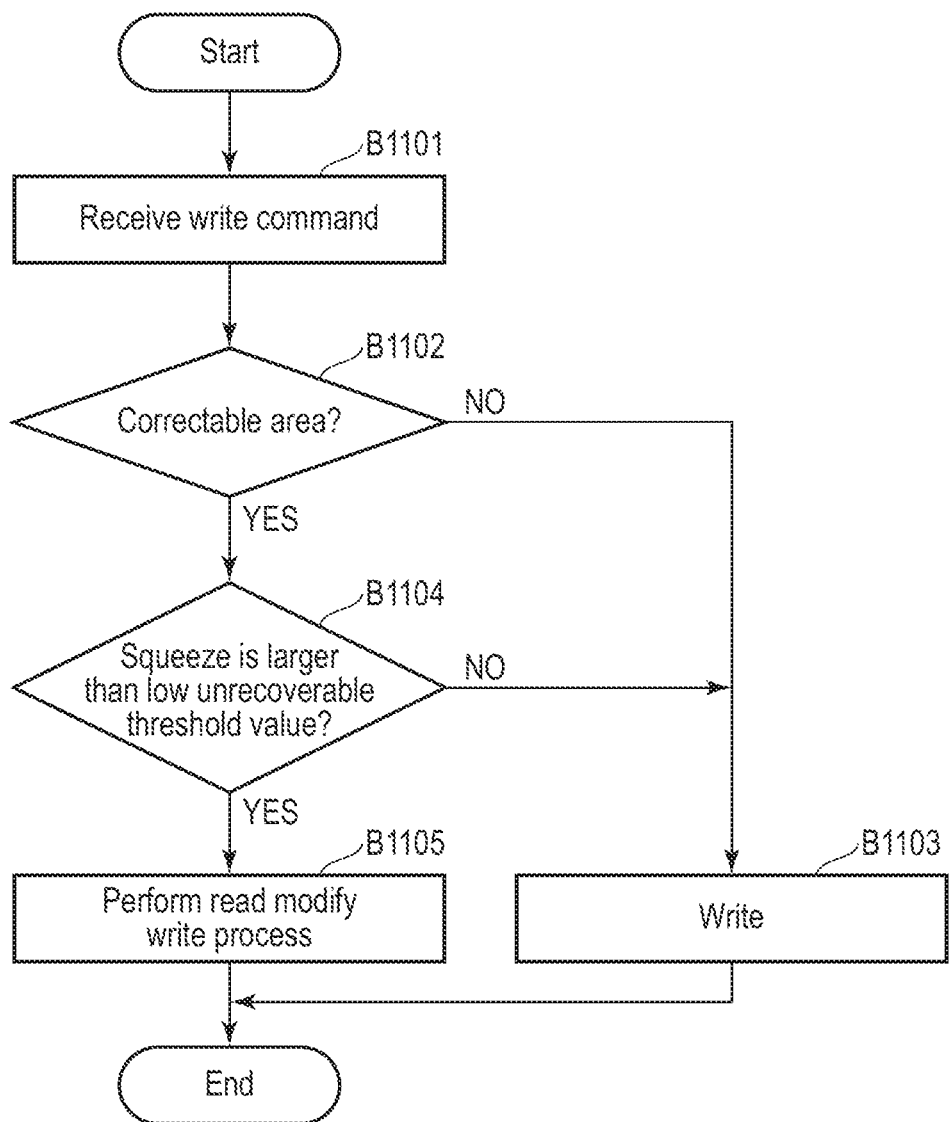
F I G. 11

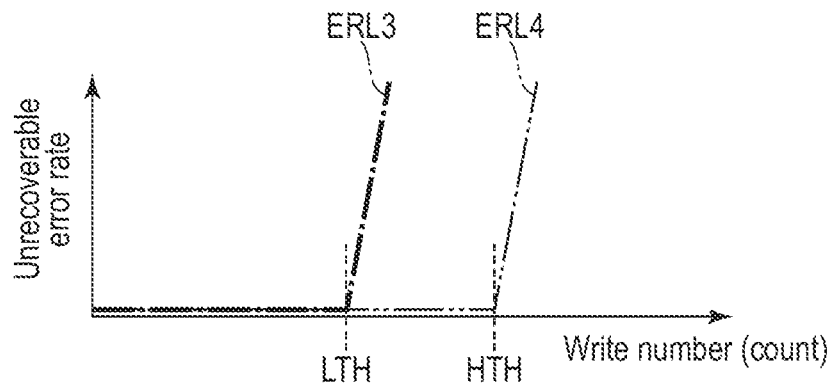
F I G. 13
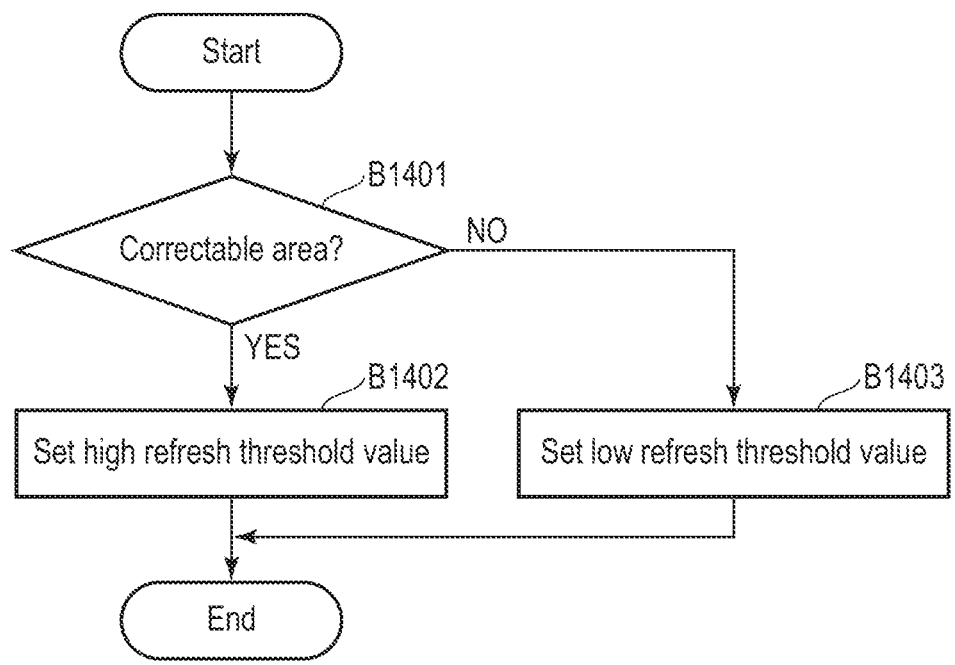
F I G. 14

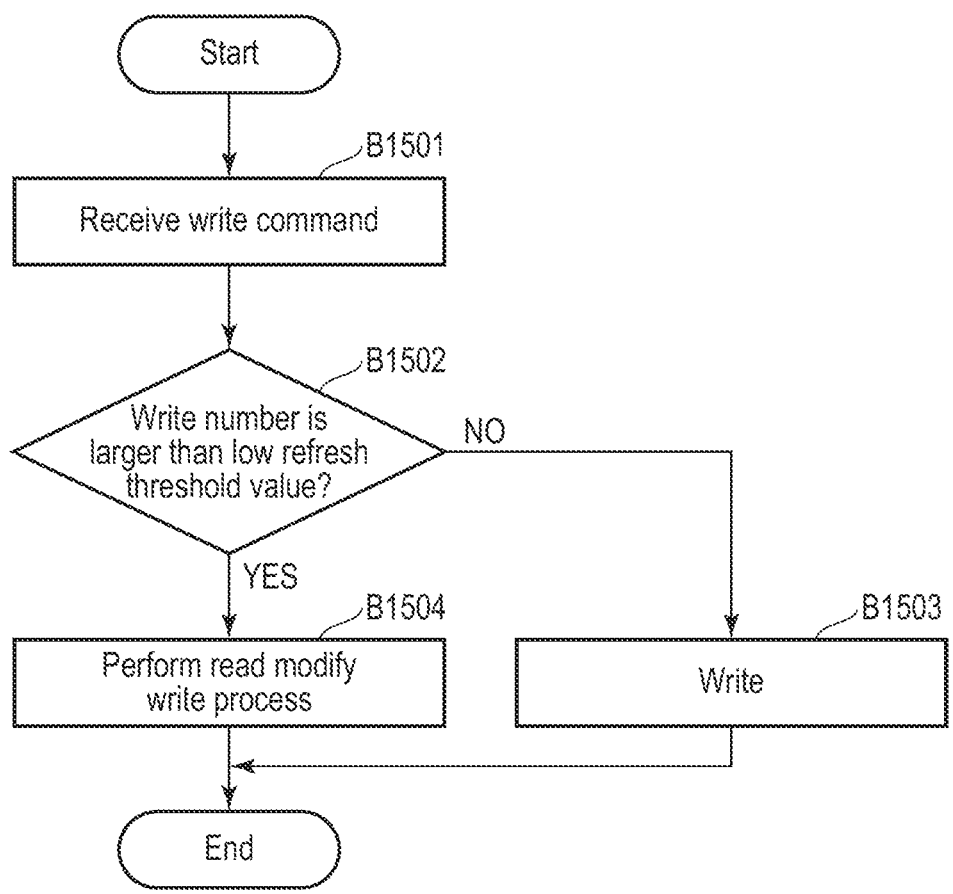
F I G. 15

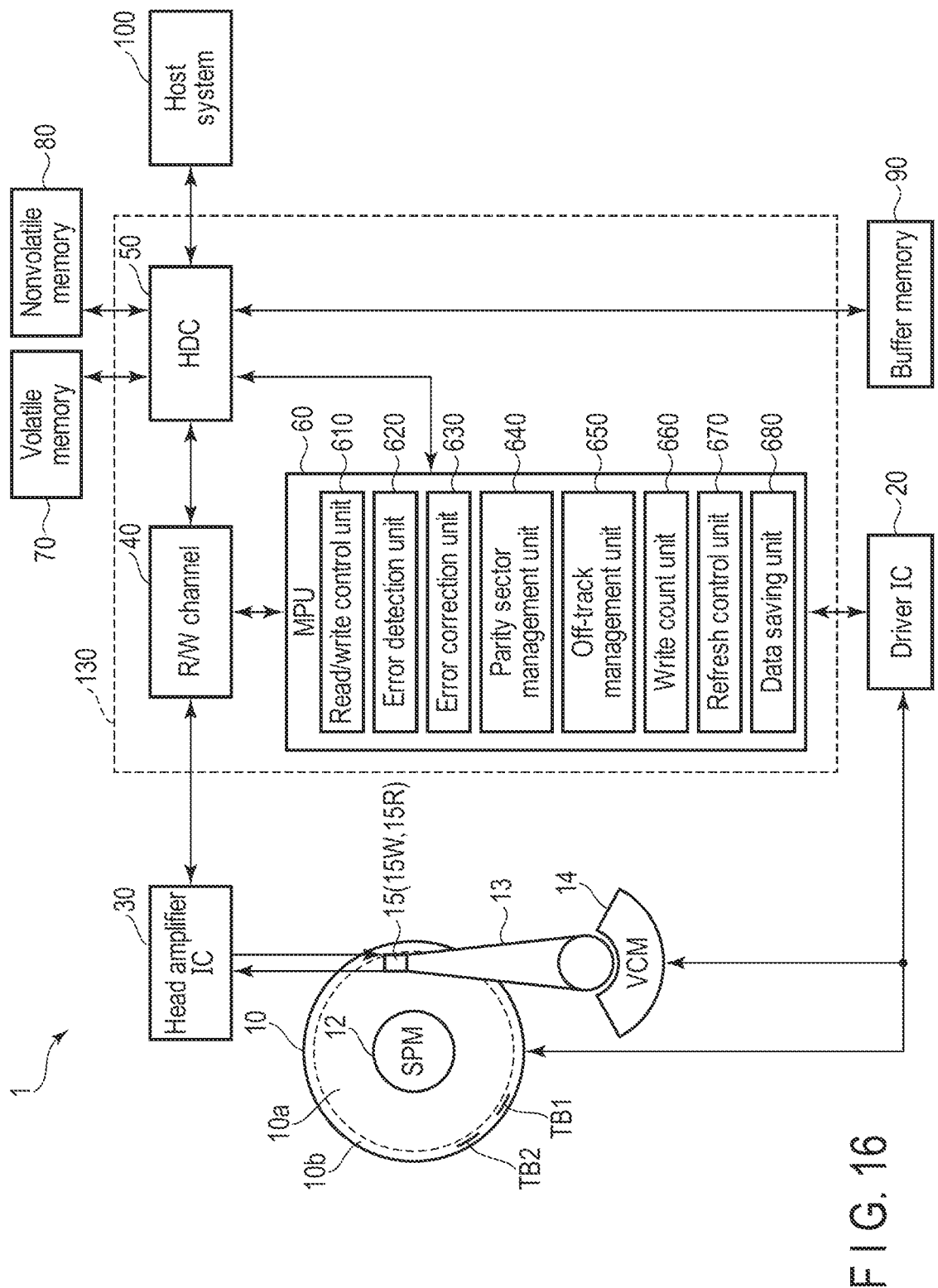
F I G. 16

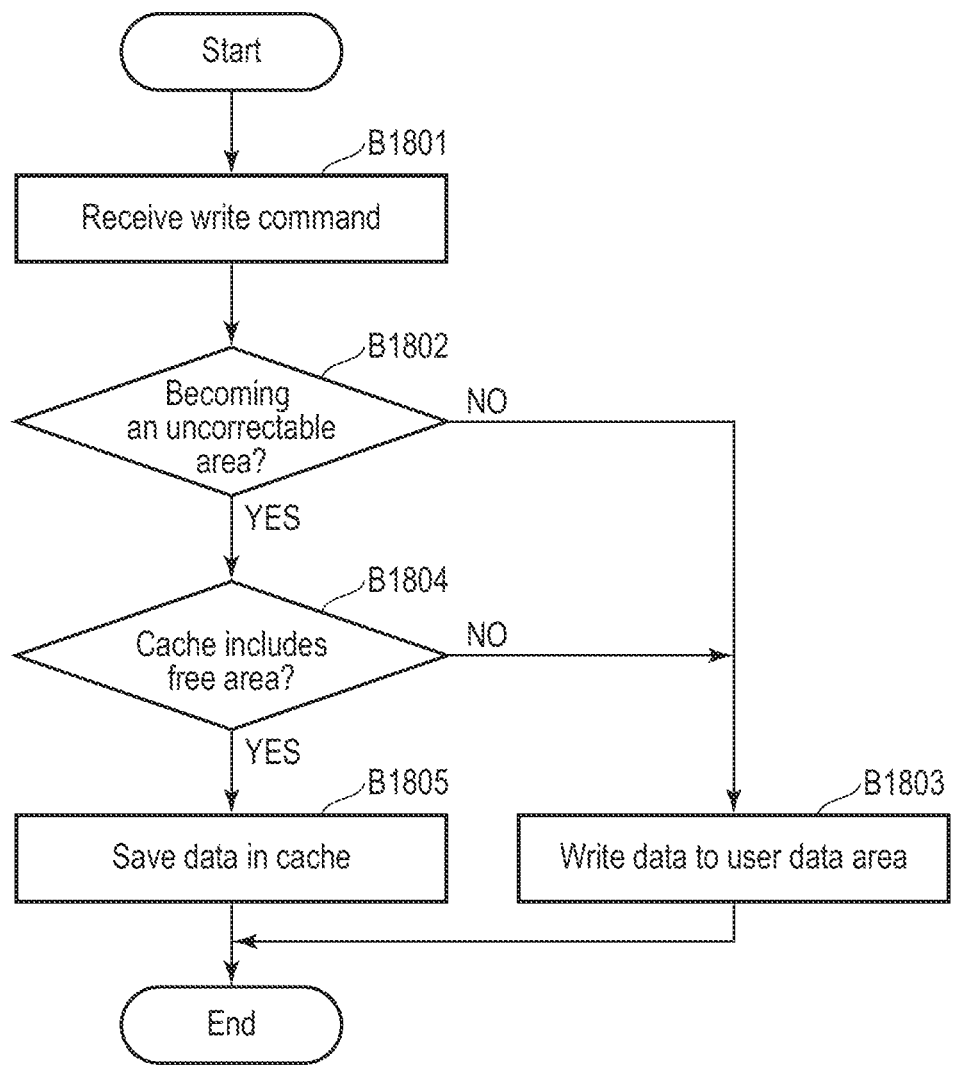
F I G. 18

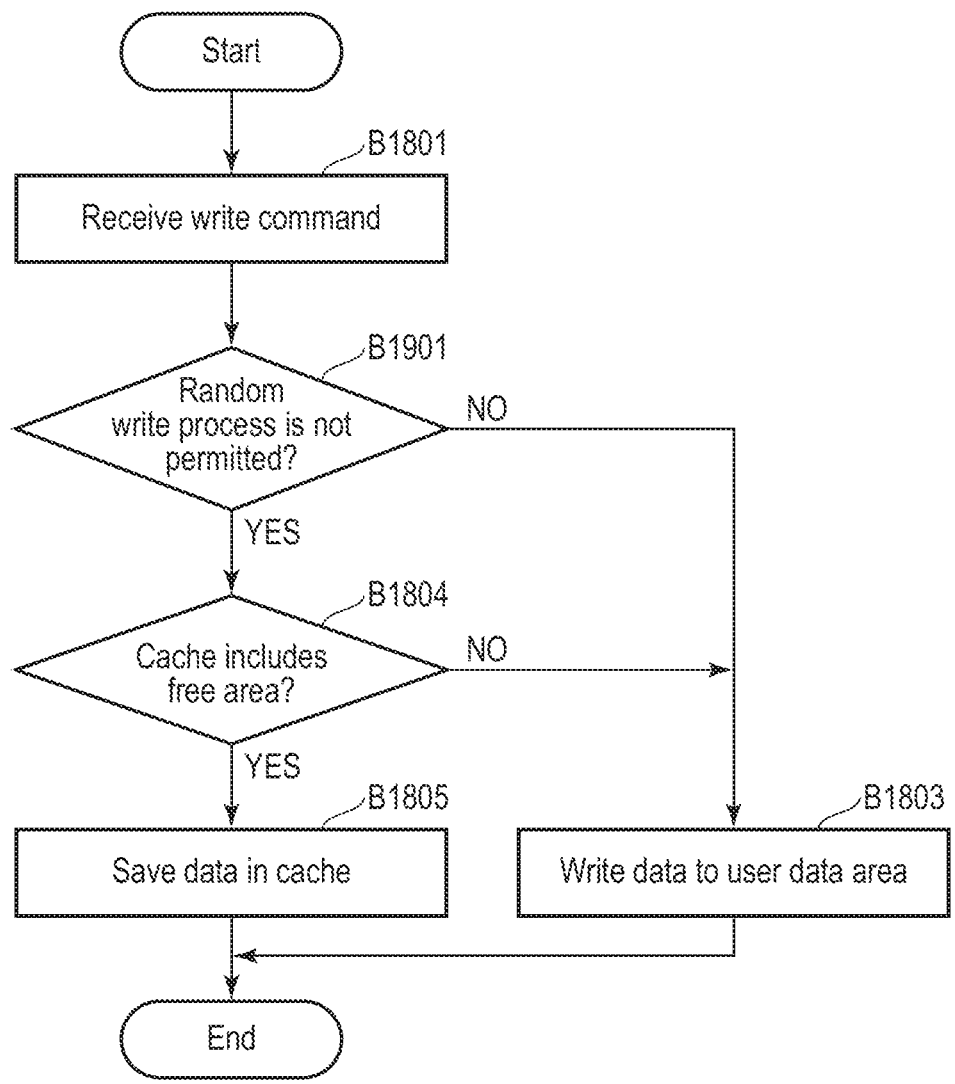
F I G. 19

MAGNETIC DISK DEVICE AND DOL SETTING METHOD

CROSS-REFERENCE TO RELATED APPLICATIONS

This application is a continuation of application Ser. No. 17/888,255 filed on Aug. 15, 2022 and based upon and claims the benefit of priority from Japanese Patent Application No. 2021-207845, filed Dec. 22, 2021, the entire contents of which are incorporated herein by reference.

FIELD

Embodiments described herein relate generally to a magnetic disk device and a DOL setting method.

BACKGROUND

A magnetic disk device may have an error correction function of correcting a sector based on a parity sector corresponding to a track including the sector when the sector cannot be corrected (saved or restored) by a correction code corresponding to the sector. The magnetic disk device performs an exclusive OR (XOR) operation for the sectors of a predetermined track and writes a result of the XOR operation to the track as a parity sector. When the magnetic disk device detects an error in a predetermined sector of the track, it executes an error correction process (which may be referred to as a track ECC process hereinafter) to correct the error with an error correction code based on the parity sector corresponding to the track. When the magnetic disk device overwrites data randomly by conventional magnetic recording (CMR) on part of a track including the parity sector, it cannot perform the track ECC process for the track.

The magnetic disk device sets a drift of level (DOL) or a write off track slice (WOS) to a target track. The DOL and WOS are the upper limit of the amount of shift from a target position of the target track, for example a track center, in the radial direction of a disk.

In addition, a side erase in which data is erased by adjacent track interface (ATI) of leakage magnetic flux from a head when data is written, may occurs in the magnetic disk device. The ATI varies, for example, depending on head characteristics, track per inch (TPI) setting values, write current setting values and the like. In order to prevent the side erase, the magnetic disk device has a function of rewriting data of a predetermined track (refresh function) when the number of times of writing data to a peripheral track of the predetermined track reaches a prescribed number of times.

BRIEF DESCRIPTION OF THE DRAWINGS

FIG. 1 is a block diagram showing a configuration of a magnetic disk device according to an embodiment.

FIG. 4 is a schematic diagram showing an example of the track ECC process.

FIG. 10 is a flowchart showing an example of a DOL setting method according to the embodiment.

FIG. 11 is a flowchart showing an example of a write process according to the embodiment.

FIG. 13 is a schematic diagram showing an example of a refresh threshold value according to the first modification.

FIG. 14 is a flowchart showing an example of a method for setting a refresh threshold value according to the embodiment.

FIG. 15 is a flowchart showing an example of a write process for a correctable area according to the embodiment.

FIG. 16 is a block diagram showing a configuration of a magnetic disk device according to a second modification.

FIG. 18 is a flowchart showing an example of the saving process according to the second modification.

FIG. 19 is a flowchart showing an example of the saving process according to the second modification.

DETAILED DESCRIPTION

Figure 2:
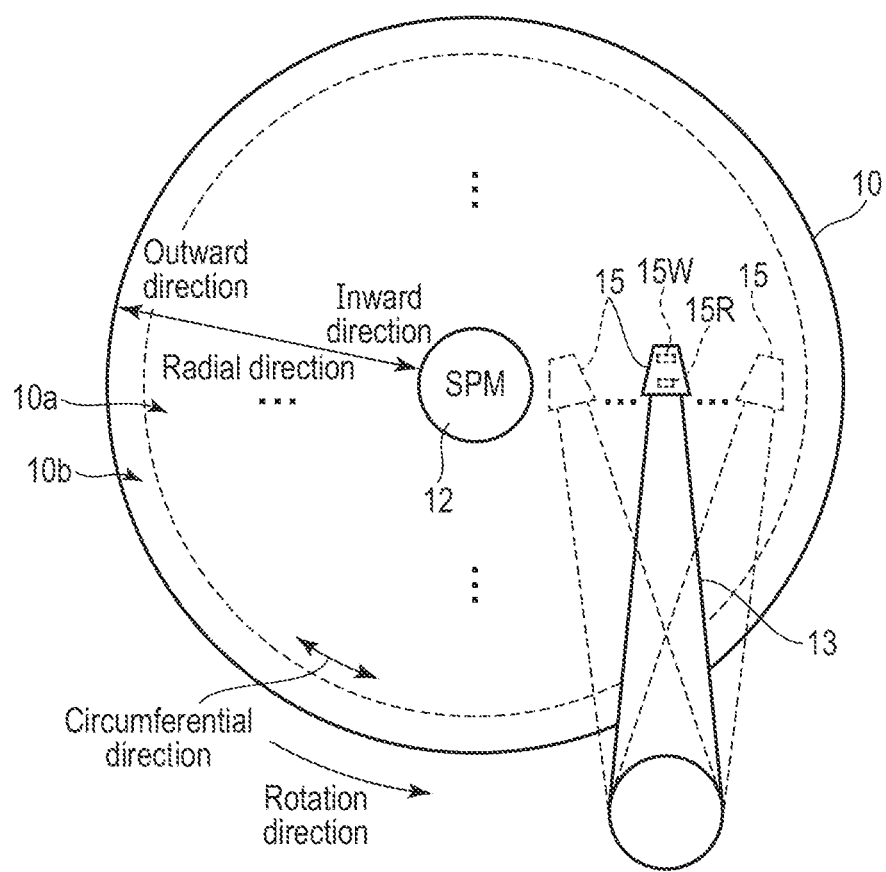
FIG. 2 is a schematic diagram showing an example of placement of a head with respect to a disk according to the embodiment.

Various embodiments will be described hereinafter with reference to the accompanying drawings. In general, according to one embodiment, a magnetic disk device comprising a disk, a head which writes data to the disk and reads data from the disk, and a controller which sets a first DOL for a first sector group and a second DOL for a second sector group to different values, the first sector group including one or more first sectors and a first parity sector, the first sectors which allow an error correction process to be performed for each track based on the first parity sector, and are continuously arranged in a circumferential direction of the disk from the first parity sector, the second sector group including one or more second sectors which allow no error correction process to be performed for each track, and are continuously arranged in the circumferential direction.

The drawings are only one example and do not limit the scope of the invention.

Embodiment

FIG. 1 is a block diagram showing a configuration of a magnetic disk device 1 according to an embodiment.

The magnetic disk device 1 includes a head disk assembly (HDA), which will be described later, a driver IC 20, a head amplifier integrated circuit (which may be referred to as a head amplifier IC or a preamplifier hereinafter) 30, a volatile memory 70, a nonvolatile memory 80, a buffer memory (buffer) 90, and a system controller 130 that is a one-chip integrated circuit. The magnetic disk device 1 is connected to a host system (referred to simply as a host hereinafter) 100.

The HDA includes a magnetic disk (which may be referred to as a disk hereinafter) 10, a spindle motor (which may be referred to as an SPM hereinafter) 12, an arm 13 with a head 15, and a voice coil motor (which may be referred to as a VCM hereinafter) 14. The disk is attached to the SPM 12 and rotated by driving the SPM 12. The arm 13 and VCM 14 constitute an actuator. When the VCM 14 is driven, the actuator controls and moves the head 15 of the arm 13 to a predetermined position of the disk 10. Two or more disks 10 and heads 15 may be provided. Two or more actuators may also be provided.

In the disk 10, a user data area 10a which is available from a user and a system area 10b in which information necessary for system management is recorded, are allocated to an area to which data can be written. Note that the disk 10 may include, as an area other than the user data area 10a and system area 10b, a media cache (which may be referred to as a media cache area) which temporarily holds data (or commands) transferred from the host 100 or the like before the data (or commands) is written to a predetermined area of the user data area 10a. Hereinafter, the direction from the inner periphery to the outer periphery of the disk 10 or the direction from the outer periphery to the inner periphery of the disk 10 will be referred to as a radial direction. In the radial direction, the direction from the inner periphery to the outer periphery will be referred to as an outward direction (or outside), and the direction from the outer periphery to the inner periphery, that is, the direction opposite to the outward direction will be referred to as an inward direction (or inside). The direction orthogonal to the radial direction of the disk 10 will be referred to as a circumferential direction. In other words, the circumferential direction corresponds to a direction along the circumference of the disk 10. In addition, a predetermined position in the radial direction of the disk 10 may be referred to as a radial position, and a predetermined position in the circumferential direction of the disk 10 may be referred to as a circumferential position. The radial and circumferential positions may collectively be referred to simply as a position. The disk 10 is divided into a plurality of areas (which may be referred to as zones or zone areas hereinafter) for each given range in the radial direction. The zones each include a plurality of tracks. The tracks each include a plurality of sectors. Note that the term "track" is used in various meanings, such as one of the areas into which the disk 10 is divided for each given range in the radial direction, data written to one of the areas into which the disk 10 is divided for each given range in the radial direction, data written to an area extending in the circumferential direction at a predetermined radial position of the disk 10, an area for one revolution at a predetermined radial position of the disk 10, data for one revolution written to the area for one revolution at a predetermined radial position of the disk 10, a path of the head 15 positioned at a predetermined radial position of the disk 10 for writing, data written by the head 15 positioned at a predetermined radial position of the disk 10, and data written to a predetermined track of the disk 10. The term "sector" is used in various meanings, such as one of the areas into which a predetermined track of the disk 10 is divided in the circumferential direction, data written to one of the areas into which a predetermined track of the disk 10 is divided in the circumferential direction, an area at a predetermined circumferential position at a predetermined radial position of the disk 10, data written to the area at a predetermined circumferential position at a predetermined radial position of the disk 10, and data written to a predetermined sector of the disk 10. The "width of the track in the radial direction" may be referred to as "track width". The central position of the track width may be referred to as a track center. The track center may be referred to simply as a track. The "width of the sector in the radial direction" may be referred to as "sector width". The central position of the sector width may be referred to be as a sector center. The sector center may be referred to simply as a sector. The track center includes a plurality of sector centers.

The head 15 includes a slider as a main body, and the slider is mounted with a write head 15W and a read head 15R. The write head 15W writes data to the disk 10. For example, the write head 15W writes a predetermined track to the disk 10. The read head 15R reads data from the disk 10. For example, the read head 15R reads a predetermined track from the disk 10. Note that the "write head 15W" may be referred to simply as "head 15" and the "read head 15R" may be referred to simply as "head 15". In addition, the write and read heads 15W and 15R may collectively be referred to as "head 15". The "central part of the head 15" may be referred to as "head 15", the "central part of the write head 15W" may be referred to as "write head 15W" and the "central part of the read head 15R" may be referred to as "read head 15R". The "central part of the write head 15W" may be referred to simply as "head 15" and the "central part of the read head 15R" may be referred to simply as "head 15". "Positioning the central of the head 15 at a predetermined position" may be expressed by "positioning the head 15 at a predetermined position", "placing the head 15 at a predetermined position", "locating the head 15 at a predetermined position" and the like. "Positioning the central part of the head 15 at a target position (which may be referred to as an area target position hereinafter) of a predetermined area, for example, at the center of a predetermined area in the radial direction" may be expressed by "positioning the head 15 in a predetermined area", "placing the head 15 in a predetermined area", "locating the head 15 at a predetermined area", "positioning in a predetermined area", "placing on a predetermined area", "locating in a predetermined area" or the like. "Positioning the central part of the head at a target position of a predetermined track (which may be referred to as a track target position hereinafter), for example, at a track center" may be expressed by "positioning the head 15 in a predetermined track", "placing the head 15 on a predetermined track", "locating the head 15 in a predetermined track", "positioning in a track", "placing on a track", "locating in a track" or the like.

FIG. 2 is a schematic diagram showing an example of placement of the head 15 with respect to the disk 10 according to the present embodiment. As shown in FIG. 2, the direction in which the disk 10 rotates in its circumferential direction will be referred to as a rotation direction. In the example shown in FIG. 2, the rotation direction is a counterclockwise direction, but it may be an opposite direction (clockwise direction).

The head 15 rotates about a rotation axis by the VCM 14 with respect to the disk 10 and moves to a predetermined position from inside to outside or from outside to inside.

In the example shown in FIG. 2, in the disk 10, the system area 10b is provided outside the user data area 10a. In other words, the user data area 10a is provided inside the system area 10b. The system area is provided on the outermost circumference of the disk 10. Note that the user data area 10a may be divided in the radial direction of the disk 10. The system area 10b may be provided at a position different from that shown in FIG. 2. For example, the system area 10b may be provided between a plurality of user data areas 10a on the disk 10 or may be provided on the innermost circumference of the disk 10.

The driver IC 20 controls the driving of the SPM 12 and VCM 14 under the control of the system controller 130 (specifically an MPU 60 to be described later).

The head amplifier IC (preamplifier) 30 includes a read amplifier, a write driver and the like. The read amplifier amplifies a read signal read from the disk 10 and outputs the amplified read signal to the system controller 130 (specifically a read/write (R/W) channel to be described later). The write driver supplies the head 15 with a write current corresponding to the signal output from the R/W channel 40.

The volatile memory 70 is a semiconductor memory from which data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that stores data even when power supply is cut off. The nonvolatile memory 80 is, for example, a NOR or NAND flash read only memory (FROM).

The buffer memory 90 is a semiconductor memory that temporarily records data or the like transferred between the magnetic disk device 1 and the host 100. Note that the buffer memory 90 may be formed integrally with the volatile memory 70. The buffer memory 90 may be, for example, a DRAM, a static random access memory (SRAM), an SDRAM, a ferroelectric random access memory (FeRAM), a magnetoresistive random access memory (MRAM) or the like.

The system controller 130 is implemented using, for example, a large-scale integrated circuit (LSI) called a system-on-a-chip (SoC) in which a plurality of elements are integrated on a single chip. The system controller 130 includes a read/write (R/W) channel 40, a hard disk controller (HDC) 50, a microprocessor or a microprocessing unit (MPU) 60. The system controller 130 is electrically connected to the driver IC 20, head amplifier IC 30, volatile memory 70, nonvolatile memory buffer memory 90, host system 100 and the like.

In response to an instruction from the MPU 60 to be described later, the R/W channel 40 performs signal processing for data transferred from the disk 10 to the host 100 (which may be referred to as read data hereinafter) and data transferred from the host 100 (which may be referred to as write data hereinafter). The R/W channel 40 has a circuit or function for modulating the write data. The R/W channel 40 also has a circuit or function for measuring and demodulating the signal quality of the read data. The R/W channel 40 is electrically connected to the head amplifier IC HDC 50, MPU 60 and the like.

The HDC 50 controls data transfer. For example, the HDC 50 controls the transfer of data between the host 100 and the disk 10 in response to an instruction from the MPU 60 to be described later. The HDC 50 is electrically connected to the R/W channel 40, MPU 60, volatile memory 70, nonvolatile memory 80, buffer memory 90, and the like.

The MPU 60 is a main controller that controls each unit of the magnetic disk device 1. The MPU 60 controls the VCM 14 through the driver IC 20 and performs servo control for positioning the head 15. The MPU 60 controls the SPM 12 through the driver IC 20 to rotate the disk 10. The MPU 60 controls a write operation of data to the disk 10 and selects a storage destination of data transferred from the host 100, such as write data. The MPU 60 also controls a read operation of data from the disk 10, and controls the processing of data transferred from the disk 10 to the host 100, such as read data. The MPU 60 manages a data recording area. The MPU 60 is connected to each unit of the magnetic disk device 1. The MPU 60 is electrically connected to the driver IC 20, R/W channel the HDC 50 and the like.

The MPU 60 includes a read/write control unit 610, an error detection unit 620, an error correction unit 630, a parity sector management unit 640, an off-track management unit 650, and the like. The MPU 60 performs on firmware a process of each of the units 610, 620, 630, 640 and 650. Note that the MPU 60 may include each of the units 610, 620, 630, 640 and 650 as a circuit. The read/write control unit 610, error detection unit 620, error correction unit 630, parity sector management unit 640, off-track management unit 650, and the like may be included in the R/W channel 40 or the HDC 50.

The read/write control unit 610 controls a read process of reading data from the disk 10 and a write process of writing data to the disk 10 in accordance with a command or the like from the host 100. The read/write control unit 610 controls the VCM 14 via the driver IC 20, positions the head 15 at a predetermined position on the disk 10, and performs the read process or the write process. Hereinafter, the term "access" may be used to mean recording or writing data in a predetermined area (write process), reading data from a predetermined area (read process), and moving the head 15 or the like to a predetermined area.

For example, at a predetermined interval (gap) in the radial direction from a predetermined track (or cylinder) or a predetermined sector, the read/write control unit 610 performs a write process of writing data to the track, another track adjacent to the sector (which may be referred to an adjacent track or an adjacent cylinder hereinafter) or another sector (which may be referred to an adjacent sector hereinafter) by conventional magnetic recording (CMR). The "adjacent track (or adjacent cylinder)" includes "a track (or cylinder) adjacent to a predetermined track (or cylinder) in the outward direction", "a track (or cylinder) adjacent to the predetermined track (or cylinder) in the inward direction" and "a plurality of tracks (or cylinders) adjacent to the predetermined track (or cylinder) in the outward and inward directions". The "adjacent sector" includes "a sector adjacent to a predetermined sector in the outward direction", "a sector adjacent to the predetermined sector in the inward direction" and "a plurality of sectors adjacent to the predetermined sector in the outward and inward directions". Hereinafter, the "writing data by CMR" may be referred to as "conventional recording", "performing a conventional recording process" or simply "writing". The read/write control unit 610 performs a random write process of randomly writing data and a sequential write process of sequentially writing data.

Note that the read/write control unit 610 may perform a write process by shingled write magnetic recording (SMR) or shingled write recording (SWR) in which when a plurality of tracks (or cylinders) are sequentially written, a track (or cylinder) to be written next overlaps with a track (or cylinders) to be written last. Hereinafter, "writing data by SMR or SWR" may be referred to as "SMR or SWR", "performing an SMR or SWR process" or simply "writing".

The error detection unit 620 detects data, a sector, an area and the like in which an error occurs. For example, the error detection unit 620 detects data that cannot be read (which may be referred to as read error data or error data hereinafter) or a sector that cannot be read (which may be referred to as a read error sector or an error sector hereinafter). The error data and error sector may be caused by defects, misalignment of the head 15, misalignment of adjacent tracks (or adjacent cylinders) and the like.

The error correction unit 630 recovers (corrects, saves or error-corrects) the error data or the error sector. The error correction unit 630 performs a read retry of reading error data or error sectors a plurality of times. The error correction unit 630 also performs a process of correcting an error in the error data or error sector based on an error correction code (ECC) (which may be referred to as ECC process or error correction process hereinafter). Based on an ECC (which may be referred to as a sector ECC) corresponding to error data or an error sector of a predetermined track (or cylinder), the error correction unit 630 performs an ECC process (which may be referred to as a sector ECC process hereinafter) for the error data or error sector. The sector ECC process corresponds to error correction or error correction process for each sector.

On the basis of the ECC (which may be referred to as track ECC hereinafter) corresponding to a predetermined track (or cylinder) or part of the track (or cylinder), such as a plurality of data items or a plurality of sectors arranged continuously in the circumferential direction in a predetermined track (or cylinder), the error correction unit 630 performs an ECC process (which may be referred to as a track ECC process hereinafter) for the predetermined track (or cylinder) or part of the predetermined track (or cylinder), such as error data or error sectors of the data items or the sectors arranged continuously in the circumferential direction in the track. The track ECC process corresponds to an error correction process or an error correction process in track units. The track units may include not only a physical track unit but also an area unit that is smaller than the physical track unit. For example, based on parity data corresponding to a predetermined track (or cylinder) or part of the predetermined track or a parity sector, the error correction unit 630 performs a track ECC process for an error sector of the track (or cylinder) or the part of the track. The error correction unit 630 records, for example, information on the error data or error sector (which may be referred to as error data information or error sector information hereinafter) in a predetermined recording area, such as the disk 10, volatile memory 70 and nonvolatile memory 80.

The parity sector management unit 640 performs an exclusive OR (XOR) operation to calculate a parity sector (or parity data), writes the parity sector (or parity data) and manage the parity sector (or parity data).

When a predetermined track (or a predetermined cylinder) is written, the parity sector management unit 640 performs an XOR operation for all sectors (or data) other than the parity sector of the track (or cylinder) to calculate a parity sector (or parity data), write (or changes) the calculated parity sector (or parity data), and manage the parity sector (or parity data). When some sectors (or data) are written to a predetermined track (or a predetermined cylinder), the parity sector management unit 640 reads the predetermined track (or the predetermined cylinder), performs an XOR operation for all sectors (or data) other than a parity sector of a track (or a cylinder) in which a sector (or data) corresponding to some sectors (or data) is replaced with some sectors (or data) in a predetermined recording area, such as the volatile memory 70 to calculate a parity sector, writes (or changes) the sectors other than the parity sector and the calculated parity sector to the same track (or cylinder), and manages the parity sector (or parity data). Hereinafter, the fact that "when predetermined data (which may be referred to as update data hereinafter) is written, at least one sector or a track (cylinder) to which the update data is written is read, an XOR operation is performed for all sectors (which may be referred to as an update sector group hereinafter) other than a parity sector of said at least one sector or the track (cylinder) (which may be referred to as an update sector or an update track (update cylinder) hereinafter) in which data corresponding to the update data in said at least one sector and the track (cylinder) is replaced with the update data to calculate a parity sector (which may be referred to as an update parity sector), and the update sector group and the update parity sector are written to the same sector or track" may be referred to as "read modifier write". For convenience of description, "performing an XOR operation for sectors other than a parity sector" may be referred to as "performing an XOR operation for sectors".

The parity sector management unit 640 performs an XOR operation for data in a prescribed area to calculate a parity sector and write the calculated parity sector to a predetermined area of the disk 10. The parity sector management unit 640 performs an XOR operation for all sectors of a predetermined track (or a predetermined cylinder) to calculate a parity sector and write the calculated parity sector to the track (or the cylinder). Note that the parity sector management unit 640 may perform an XOR operation for some sectors of a predetermined track (or a predetermined cylinder) to calculate a parity sector and write the calculated parity sector to the track (or cylinder). For example, the parity sector management unit 640 may perform an XOR operation for all sectors (which may be referred to as an effective sector hereinafter) other than a sector that is set or registered as an invalid sector due to a defect or the like caused in a predetermined track (or a predetermined cylinder) (which may be referred to as a defect registered sector hereinafter) to calculate a parity sector and write the calculated parity sector to the track (or cylinder). The defect registered sector corresponds to a sector not used for data recording or the like, such as an error sector. The effective sector corresponds to a sector used for data recording and the like. For convenience of description, "performing an XOR operation for an effective sector other than the defect registered sector" may be referred to as "performing an XOR operation for a sector".

The parity sector management unit 640 manages whether a parity sector corresponding to each track or part of each track is an effective parity sector that can be used in error correction, such as a track ECC process or an ineffective parity sector that cannot be used in error correction, such as a track ECC process.

The parity sector management unit 640 manages a parity sector, which is obtained by performing an XOR operation for all effective sectors of a predetermined track, as an effective parity sector. The parity sector management unit 640 records the effective parity sector in a predetermined recording area, such as (the system area 10b of) the disk 10, the volatile memory the nonvolatile memory 80, and the buffer memory 90 as a table (which may be referred to as a management table hereinafter) TB1. The parity sector management unit 640 records a track or cylinder capable of performing a track ECC process (which may be referred to as a correctable track or a correctable cylinder hereinafter) based on the effective parity sector in a predetermined recording area, such as (the system area of) the disk 10, the volatile memory 70, the nonvolatile memory 80 and the buffer memory 90 as a management table TB1.

The parity sector management unit 640 writes (or overwrites) at least one sector, such as effective sectors (which may be referred to as back sectors hereinafter) which are arranged continuously in the circumferential direction from the parity sector in a predetermined track, and manages all back sectors, such as parity sectors obtained by performing an XOR operation for the effective sectors, as effective parity sectors. The parity sector management unit 640 records the effective parity sectors in a predetermined recording area, such as (the system area 10*b* of) the disk 10, the volatile memory 70, the nonvolatile memory and the buffer memory 90, as the management table TB1. The parity sector management unit 640 records a back sector, which is capable of performing a track ECC process based on the effective parity sectors in a predetermined track, in a predetermined recording area, such as (the system area 10*b* of) the disk 10, the volatile memory 70, the nonvolatile memory 80 and the buffer memory 90, as the management table TB1. When a predetermined track includes a back sector capable of performing a track ECC process based on the effective parity sectors, the parity sector management unit 640 records sectors (which may be referred to as front sectors) other than the back sectors, which are not capable of performing the track ECC process, in a predetermined recording area, such as (the system area of) the disk 10, the volatile memory 70, the nonvolatile memory 80 and the buffer memory 90, as the management table TB1.

When the front sector, such as the parity sector of a track to which an effective sector (which may be referred to as a front sector) is written (overwritten) is a parity sector (which may be referred to as a previous parity sector) corresponding to a result of the XOR operation for all sectors of a track to which the front sector has not been written, the parity sector management unit 640 manages the parity sector as an ineffective parity sector. The parity sector management unit 640 records the ineffective parity sector in a predetermined recording area, such as (the system area 10*b* of) the disk 10, the volatile memory the nonvolatile memory 80 and the buffer memory 90, as the management table TB1. The parity sector management unit 640 records a track or cylinder which is not capable of performing a track ECC process (which may be referred to as an uncorrectable track or an uncorrectable cylinder hereinafter) in a predetermined recording area, such as (the system area 10*b* of) the disk 10, the volatile memory 70, the nonvolatile memory and the buffer memory 90, as the management table TB1.

Hereinafter, "at least one sector capable of performing a track ECC process" may be referred to as "a correctable sector or a logical track". Also, "at least one sector which is not capable of a track ECC process" may be referred to as "uncorrectable sector". The "areas such as the correctable track, correctable cylinder and correctable sector for which a track ECC process can be performed" may collectively be referred to as "a correctable area" and the "areas such as the correctable track, correctable cylinder and correctable sector for which a track ECC process cannot be performed" may collectively be referred to as "an uncorrectable area".

The parity sector management unit 640 manages the correctable and uncorrectable areas of the disk 10 using the management table TB1. For example, when the correctable and uncorrectable areas from tracks 0 to 7 are represented as 3Eh in hexadecimal notation (binary notation: 00111110) in the management table TB1, the parity sector management unit 640 determines tracks 2 to 6 as correctable areas. In this case, in the management table TB1, each track is represented by one-bit information, and "1" indicates a correctable area and "0" indicates an uncorrectable area. The parity sector management unit 640 refers to the management table TB1 when it performs a write process via the read/write control unit 610 and when it performs a read process via the read/write control unit 610.

The parity sector management unit 640 manages the correctable and uncorrectable areas each time it receives from the host 100 or the like a command for performing a write process in which an error cannot be corrected for each track, such as a sequential write process to be performed to the middle of one track or a command for performing a random write process. The parity sector management unit 640 updates or changes the correctable and uncorrectable areas each time the random write process is performed. When a random write process is performed for part of the correctable area, the parity sector management unit 640 changes the correctable area to an uncorrectable area. For example, when a random write process is performed for part of a correctable track, the parity sector management unit 640 changes the correctable track to an uncorrectable track. In other words, when data of less than one track is randomly written to a correctable track, the parity sector management unit 640 changes the correctable track to an uncorrectable track.

The parity sector management unit 640 manages an area where a read error is caused when a correctable area is changed to an uncorrectable area (which may be referred to as a random write inhibit area hereinafter) using the table (which may be referred to as a random write inhibit table hereinafter) TB2. In other words, the parity sector management unit 640 includes a random write inhibit table TB2 for managing the random write inhibit area.

For example, the parity sector management unit 640 manages a track where a read error is caused when a correctable track is changed to an uncorrectable track (which may be referred to as a random write inhibit track hereinafter) using the random write inhibit table TB2. In other words, the parity sector management unit 640 includes a random write inhibit table TB2 for managing the random write inhibit track.

For example, the parity sector management unit 640 manages at least one sector where a read error is caused when a correctable sector is changed to an uncorrectable sector (which may be referred to as a random write inhibit sector hereinafter) using the random write inhibit table TB2. In other words, the parity sector management unit 640 includes a random write inhibit table TB2 for managing the random write inhibit sector.

The off-track management unit 650 manages an area target position of a target area (which may be referred to as a target area hereinafter) of the disk 10, such as a drift of level (DOL) or a write off track slice (WOS) which is an upper limit value of the amount of displacement from the center of a predetermined area toward the radial direction. The off-track management unit 650 manages a track target position of a track (which may be referred to as a target track hereinafter) of the disk 10, such as a DOL or a WOS which is an upper limit value of the amount of displacement (which may be referred to as an off-track amount hereinafter) from the center of the track toward the radial direction. The off-track management unit 650 includes a plurality of DOLs.

The off-track management unit 650 sets a plurality of DOLs to a plurality of areas, respectively. In other words, the off-track management unit 650 sets a plurality of DOLs to the directions toward a plurality of areas, respectively. The off-track management unit 650 sets a plurality of DOLs to a plurality of tracks, respectively. In other words, the off-track management unit 650 sets a plurality of DOLs to the directions toward a plurality of tracks, respectively. The off-track management unit 650 sets a plurality of DOLs to a plurality of sectors, respectively. In other words, the off-track management unit 650 sets a plurality of DOLs to the directions toward a plurality of sectors, respectively.

The off-track management unit 650 sets a plurality of DOLs to a predetermined area (in a direction toward a predetermined area). The off-track management unit 650 respectively sets a plurality of DOLs to a plurality of areas into which a predetermined area is divided (in directions toward a plurality of areas into which a predetermined area is divided). For example, the off-track management unit 650 sets a plurality of DOLs to a predetermined track (a direction toward a predetermined track). The off-track management unit 650 respectively sets a plurality of DOLs to a plurality of areas into which a predetermined track is divided (in directions toward a plurality of areas into which a predetermined track is divided).

According to whether an area positioned in the radial direction of a target area (which may be referred to as a radial area) is a correctable area (which may be referred to as a correctable radial area) or an uncorrectable area (which may be referred to as an uncorrectable radial area), the off-track management unit 650 sets a different DOL to the radial area of the target area (in a direction toward the radial area). In other words, the off-track management unit 650 sets different DOL values to the correctable and uncorrectable radial areas of the target area.

The correctable radial area can make the occurrence rate of unrecoverable errors, which are errors that cannot be read, lower than the uncorrectable radial area when data is written to a target area. Therefore, the area target position in the radial direction of the target area relative to the correctable radial area, for example, the distance or the amount of approach (referred to as squeeze hereinafter) from the center of an area target position, such as a target area, in the radial direction of the target area for the correctable radial area can be made greater than the squeeze for the uncorrectable radial area. In other words, a squeeze margin for the correctable radial area can be made larger than that for the uncorrectable radial area.

When the off-track management unit 650 determines that the radial area of a target area is a correctable radial area, it sets a predetermined DOL (which may be referred to as a high DOL) to the radial area (in the direction toward the radial area). When the off-track management unit 650 determines that the radial area of a target area is an uncorrectable radial area, it sets a DOL (which may be referred to as a low DOL) whose absolute value is smaller than that of the high DOL to the radial area (in the direction toward the radial area) smaller than the absolute value of the high DOL.

According to whether an area adjacent to the target area in the radial direction (which may be referred to as an adjacent area hereinafter) is a correctable area (which may be referred to as a correctable adjacent area) or an uncorrectable area (which may be referred to as an uncorrectable adjacent area hereinafter), the off-track management unit 650 sets a different DOL to the adjacent area of the target area (in a direction toward the adjacent area). In other words, the off-track management unit 650 sets different DOL values to the correctable and uncorrectable adjacent areas in the target area.

The correctable adjacent area can make the occurrence rate of unrecoverable errors lower than the uncorrectable adjacent area when data is written to a target area. Therefore, the squeeze for the correctable adjacent area can be made greater than that for the uncorrectable adjacent area. In other words, a squeeze margin for the correctable adjacent area can be made larger than that for the uncorrectable adjacent area.

When the off-track management unit 650 determines that the adjacent area of a target area is a correctable adjacent area, it sets a high DOL to the adjacent area (in a direction toward the adjacent area). When the off-track management unit 650 determines that the adjacent area of a target area is an uncorrectable adjacent area, it sets a low DOL to the adjacent area (in a direction toward the adjacent area).

According to whether a track positioned in the radial direction of a target track (which may be referred to as a radial track hereinafter) is a correctable track (which may be referred to as a correctable radial track hereinafter) or an uncorrectable track (which may be referred to as an uncorrectable radial track), the off-track management unit 650 sets a different DOL to the radial track of the target track. In other words, the off-track management unit 650 sets different DOL values to the correctable and uncorrectable radial tracks in the target area.

The correctable radial track can make the occurrence rate of unrecoverable errors lower than the uncorrectable radial track when data is written to a target area. Therefore, the squeeze for the correctable radial track can be made greater than that for the uncorrectable radial track. In other words, a squeeze margin for the correctable radial track can be made larger than that for the uncorrectable radial track.

When the off-track management unit 650 determines that the radial track of the target track is a correctable radial track, it sets a high DOL to the radial track (in a direction toward the radial track). When the off-track management unit 650 determines that the radial track of the target track is an uncorrectable radial track, it sets a low DOL to the radial track (in a direction toward the radial track).

According to whether a track adjacent to a target track in the radial direction (which may be referred to as an adjacent track hereinafter) is a correctable track (which may be referred to as a correctable adjacent track) or an uncorrectable track (which may be referred to as uncorrectable adjacent track hereinafter), the off-track management unit 650 sets a DOL to the adjacent track of the target track (in a direction toward the adjacent track). In other words, the off-track management unit 650 sets different DOL values to the correctable and uncorrectable adjacent tracks in the target area.

The correctable adjacent track can make the occurrence rate of unrecoverable errors lower than the uncorrectable adjacent track when data is written to a target area. Therefore, the squeeze for the correctable adjacent track can be made greater than that for the uncorrectable adjacent track. In other words, a squeeze margin for the correctable adjacent track can be made larger than that for the uncorrectable adjacent track.

When the off-track management unit 650 determines that an adjacent track of a target track is a correctable adjacent track, it sets a high DOL to the adjacent track (in a direction toward the adjacent track). When the off-track management unit 650 determines that an adjacent track of a target track is an uncorrectable adjacent track, it sets a low DOL to the adjacent track (in a direction toward the adjacent track).

According to whether at least one sector (which may be referred to as a radial sector hereinafter) located in the radial direction of at least one sector targeted by a target track (which may be referred to as a target sector hereinafter) and arranged in the circumferential direction is a correctable sector (which may be referred to as a correctable radial sector) or an uncorrectable sector (which may be referred to as an uncorrectable radial sector hereinafter), the off-track management unit 650 sets a different DOL to the radial sector (in a direction toward the radial sector). In other words, the off-track management unit 650 sets different DOL values to the correctable and uncorrectable radial sectors in the target area.

The correctable radial sector can make the occurrence rate of unrecoverable errors lower than the uncorrectable radial sector when data is written to a target area. Therefore, the squeeze for the correctable radial sector can be made greater than that for the uncorrectable radial sector. In other words, a squeeze margin for the correctable radial sector can be made larger than that for the uncorrectable radial sector.

When the off-track management unit 650 determines that the radial sector of a target sector is a correctable radial sector, it sets a high DOL to the radial sector (in a direction toward the radial sector). When the off-track management unit 650 determines that the radial sector of a target track is an uncorrectable radial sector, it sets a low DOL to the radial sector (in a direction toward the radial sector).

According to whether at least one sector (which may be referred to as an adjacent sector hereinafter) adjacent to a target sector in the radial direction and arranged in the circumferential direction is a correctable sector (which may be referred to as a correctable adjacent sector hereinafter) or an uncorrectable sector (which may be referred to as an uncorrectable adjacent sector hereinafter), the off-track management unit 650 sets a DOL to the adjacent sector (in a direction toward the adjacent sector). In other words, the off-track management unit 650 sets different DOL values to the correctable and uncorrectable adjacent sectors in the target area.

The correctable adjacent sector can make the occurrence rate of unrecoverable errors lower than the uncorrectable adjacent sector when data is written to a target area. Therefore, the squeeze for the correctable adjacent sector can be made greater than that for the uncorrectable adjacent sector. In other words, a squeeze margin for the correctable adjacent sector can be made larger than that for the uncorrectable adjacent sector.

When the off-track management unit 650 determines that the adjacent sector of a target sector is a correctable adjacent sector, it sets a high DOL to the adjacent sector (in a direction toward the adjacent sector). When the off-track management unit 650 determines that the adjacent sector of a target track is an uncorrectable adjacent sector, it sets a low DOL to the adjacent sector (in a direction toward the adjacent sector).

The off-track management unit 650 manages a threshold value (which may be referred to as an unrecoverable threshold value hereinafter) of an off-track amount for a radial track (in a direction toward the radial track), such as an adjacent track (in a direction toward the adjacent track), which causes an error that cannot be read unless a track ECC process is performed for the adjacent track. The unrecoverable threshold value is greater than the DOL. The off-track management unit 650 has a plurality of unrecoverable threshold values.

The off-track management unit 650 sets a plurality of unrecoverable threshold values corresponding to a plurality of DOLs (in directions toward the DOLs). The off-track management unit 650 sets different unrecoverable threshold values to different DOLs.

The off-track management unit 650 sets an unrecoverable threshold value (which may be referred to as a low unrecoverable threshold value) that is smaller than the high DOL and larger than the low DOL for a radial track (in a direction toward the radial track) to which a high DOL is set in a target track, such as an adjacent track (in a direction toward the adjacent track). The low unrecoverable threshold value corresponds to the unrecoverable threshold value of a radial track or a radial sector to which a low DOL is set, such as an adjacent track or an adjacent sector to which a low DOL is set. Note that the unrecoverable threshold value of the radial track or radial sector to which a high DOL is set, such as an adjacent track or an adjacent sector to which a high DOL is set, may be referred to as a large unrecoverable threshold value. The large unrecoverable threshold is greater than the high DOL.

The off-track management unit 650 sets a low unrecoverable threshold value to a radial sector (in a direction toward the radial sector) to which a high DOL is set in a target sector, such as an adjacent sector (in a direction toward the adjacent sector).

When the off-track management unit 650 determines that an off-track amount (or squeeze) for a predetermined radial track (a direction toward the predetermined radial track), such as a predetermined adjacent track (a direction toward the predetermined adjacent track) in a target track is larger than a low unrecoverable threshold value corresponding to the radial track (the direction toward the radial track), such as the adjacent track (the direction toward the adjacent track), it does not authorize the read/write control unit 610 to perform a write process for the radial track. For example, when the off-track management unit 650 determines that an off-track amount (or squeeze) for a correctable adjacent track (a direction toward the correctable adjacent track) in a target track is larger than a low unrecoverable threshold value corresponding to the correctable adjacent track (the direction toward the correctable adjacent track), it does not authorize the read/write control unit 610 to perform a write process in which an error cannot be corrected for each track for part of the correctable adjacent track, such as a sequential write process to the middle of one track and a random write process. In other words, when the off-track management unit 650 determines that an off-track amount (or squeeze) for a correctable adjacent track (a direction toward the correctable adjacent track) in a target track is larger than a low unrecoverable threshold value corresponding to the correctable adjacent track (the direction toward the correctable adjacent track), it does not authorize the read/write control unit 610 to perform a random write process of data that is less than one track for the correctable adjacent track.

When the off-track management unit 650 determines that an off-track amount (or squeeze) for a predetermined radial track (a direction toward the predetermined radial track), such as a predetermined adjacent track (a direction toward the predetermined adjacent track) in a target track is larger than a low unrecoverable threshold value corresponding to the radial track (the direction toward the radial track), such as the adjacent track (the direction toward the adjacent track), it may manage the radial track in the random write inhibit table TB2. For example, when the off-track management unit 650 determines that an off-track amount (or squeeze) for a correctable adjacent track (a direction toward the correctable adjacent track) in a target track is larger than a low unrecoverable threshold value corresponding to the correctable adjacent track (the direction toward the correctable adjacent track), it may manage the correctable adjacent track in the random write inhibit table TB2.

When the off-track management unit 650 determines that an off-track amount (or squeeze) for a predetermined radial track (a direction toward the predetermined radial track), such as a predetermined adjacent track (a direction toward the predetermined adjacent track) in a target track is larger than a low unrecoverable threshold value corresponding to the adjacent track (the direction toward the adjacent track), it may perform a read modify write process for the radial track, such as the adjacent track. For example, when the off-track management unit 650 determines that an off-track amount (or squeeze) for a correctable adjacent track (a direction toward the correctable adjacent track) in a target track is larger than a low unrecoverable threshold value corresponding to the correctable adjacent track (the direction toward the correctable adjacent track), it may perform a read modify write process for the correctable radial track, such as the correctable adjacent track.

When the off-track management unit 650 determines that an off-track amount (or squeeze) for a predetermined radial sector (a direction toward the predetermined radial sector), such as a predetermined adjacent sector (a direction toward the predetermined adjacent sector) in a target sector is larger than a low unrecoverable threshold value corresponding to the radial sector (the direction toward the radial sector), such as the adjacent sector (the direction toward the adjacent sector), it does not authorize the read/write control unit 610 to perform a write process for the radial sector. For example, when the off-track management unit 650 determines that an off-track amount (or squeeze) for a correctable adjacent sector (a direction toward the correctable adjacent sector) in a target sector is larger than a low unrecoverable threshold value corresponding to the correctable adjacent sector (the direction toward the correctable adjacent sector), it does not authorize the read/write control unit 610 to perform a write process in which an error cannot be corrected for each track for part of the correctable adjacent track, such as a sequential write process to the middle of one track and a random write process. In other words, when the off-track management unit 650 determines that an off-track amount (or squeeze) for a correctable adjacent sector (a direction toward the correctable adjacent sector) in a target sector is larger than a low unrecoverable threshold value corresponding to the correctable adjacent sector (the direction toward the correctable adjacent sector), it does not authorize the read/write control unit 610 to perform, for the correctable adjacent track, a random write process of data whose amount is less than the amount of data that can be written to all areas of the correctable adjacent track.

When the off-track management unit 650 determines that an off-track amount (or squeeze) for a predetermined radial sector (a direction toward the predetermined radial sector), such as a predetermined adjacent sector (a direction toward the predetermined adjacent sector) in a target sector is larger than a low unrecoverable threshold value corresponding to the radial sector (the direction toward the radial sector), such as the adjacent sector (the direction toward the adjacent sector), it may manage the radial sector in the random write inhibit table TB2. For example, when the off-track management unit 650 determines that an off-track amount (or squeeze) for a correctable adjacent sector (a direction toward the correctable adjacent sector) in a target sector is larger than a low unrecoverable threshold value corresponding to the correctable adjacent sector (a direction toward the correctable adjacent sector), it may manage the correctable adjacent sector in the random write inhibit table TB2.

When the off-track management unit 650 determines that an off-track amount (or squeeze) for a predetermined radial sector (a direction toward the predetermined radial sector), such as a predetermined adjacent sector (a direction toward the predetermined adjacent sector) in a target sector is larger than a low unrecoverable threshold value corresponding to the radial sector (the direction toward the radial sector), such as the adjacent sector (the direction toward the adjacent sector), it may perform a read modify write process for the radial sector, such as the adjacent sector. For example, when the off-track management unit 650 determines that an off-track amount (or squeeze) for a correctable adjacent sector (a direction toward the correctable adjacent sector) in a target sector is larger than a low unrecoverable threshold value corresponding to the correctable adjacent sector (the direction toward the correctable adjacent sector), it may perform a read modify write process for the correctable radial sector, such as the correctable adjacent sector.

Figure 3:
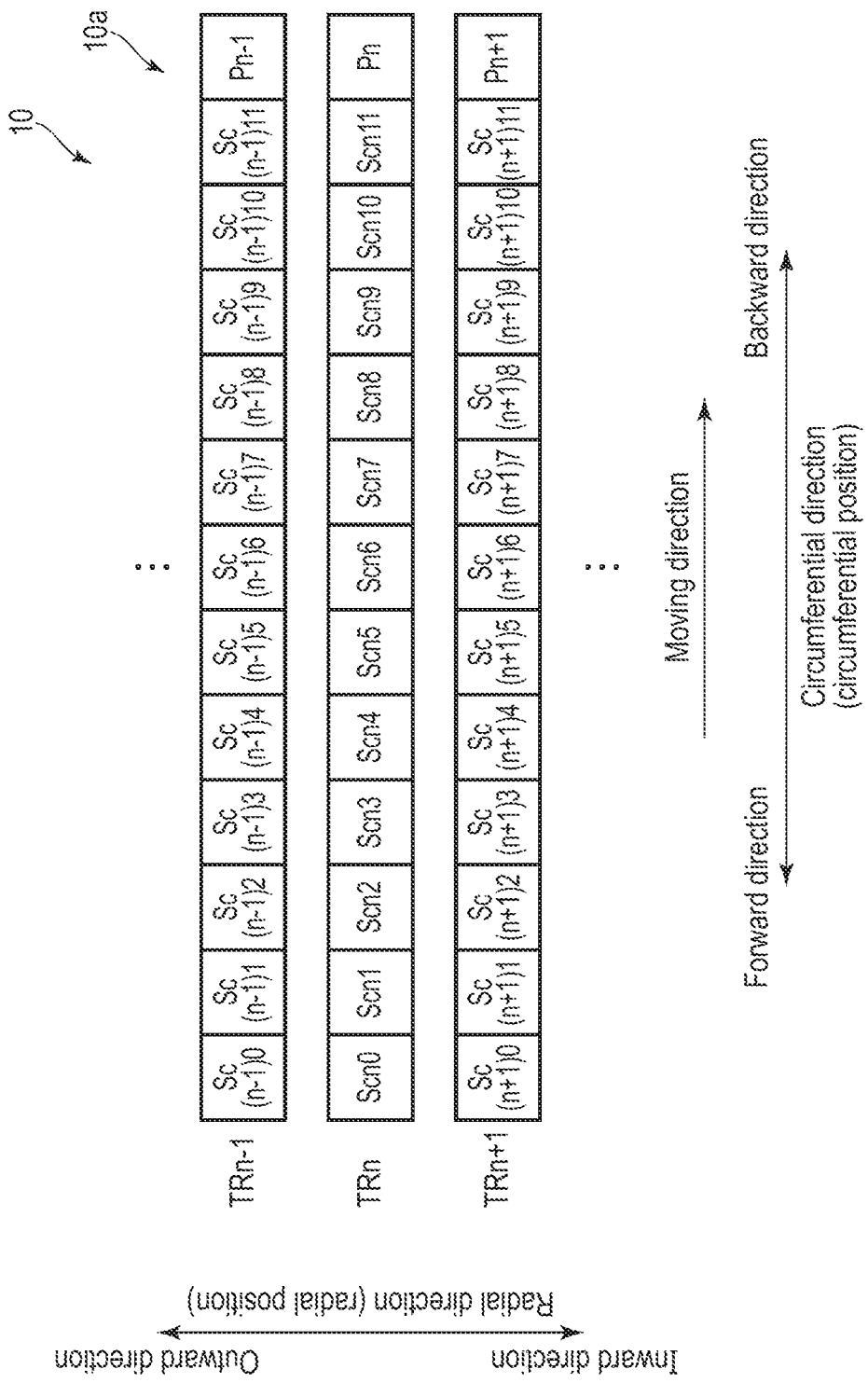
FIG. 3 is a schematic diagram showing an example of a track ECC process.

FIG. 3 is a schematic diagram showing an example of the track ECC process. FIG. 3 shows a direction in which the head 15 moves with respect to the disk 10 in the circumferential direction (circumferential position), that is, a direction in which the head 15 reads/writes data (which may be referred to as a moving direction hereinafter). In FIG. 3, the moving direction is a backward direction (which may be referred to simply as backward). Note that the moving direction may be a forward direction (which may be referred to simply as forward). FIG. 3 shows tracks TRn−1, TRn and TRn+1. In FIG. 3, the tracks TRn−1 to TRn+1 are arranged in the order described from the outward direction to the inward direction. The track TRn is adjacent to the track TRn−1 in the outward direction, and the track TRn+1 is adjacent to the track TRn in the outward direction. The track TRn−1 includes sectors Sc(n−1)0, Sc(n−1)1, Sc(n−1)2, Sc(n−1)3, Sc(n−1)4, Sc(n−1)5, Sc(n−1)6, Sc(n−1)7, Sc(n−1)8, Sc(n−1)9, Sc(n−1)10 and Sc(n−1)11, and a parity sector Pn−1. The sectors Sc(n−1)0 to Sc(n−1)11 and parity sector Pn−1 are written continuously in the order described in the moving direction. The parity sector Pn−1 corresponds to a result obtained by performing an XOR operation for the sectors Sc(n−1)0 to Sc(n−1)11. That is, the parity sector Pn−1 is an effective parity sector. The track TRn−1 corresponds to a correctable track. The track TRn includes sectors Scn0, Scn1, Scn2, Scn3, Scn4, Scn5, Scn6, Scn7, Scn8, Scn9, Scn10 and Scn11, and a parity sector Pn. The Sectors Scn0 to Scn11 and parity sector Pn are written continuously in the order described in the moving direction. The parity sector Pn corresponds to a result obtained by performing an XOR operation for the sectors Scn0 to Scn11. That is, the parity sector Pn is an effective parity sector. The track TRn corresponds to a correctable track. The track TRn+1 includes sectors Sc(n+1)0, Sc(n+1)1, Sc(n+1)2, Sc(n+1)3, Sc(n+1)4, Sc(n+1)5, Sc(n+1)6, Sc(n+1)7, Sc(n+1)8, Sc(n+1)9, Sc(n+1)10 and Sc(n+1)11, and a parity sector Pn+1. The sectors Sc(n+1)0 to Sc(n+1)11 and parity sector Pn+1 are written continuously in the order described in the moving direction. The parity sector Pn+1 corresponds to a result obtained by performing an XOR operation for the sectors Sc(n+1)0 to Sc(n+1)11. That is, the parity sector Pn+1 is an effective parity sector. The track TRn+1 corresponds to a correctable track.

In the example shown in FIG. 3, when the MPU 60 detects an error sector in the sectors Scn0 to Scn11 of the track TRn, if it cannot correct the error sector by the read retry or the sector ECC process, it performs the track ECC process for the error sector based on the parity sector Pn to correct the error sector.

FIG. 4 is a schematic diagram showing an example of the track ECC process. FIG. 4 corresponds to FIG. 3.

In the example shown in FIG. 4, the MPU 60 randomly overwrites the sectors Scn5, Scn6 and Scn7 of the track TRn. The MPU 60 records the track TRn as an uncorrectable track in a predetermined recording area, such as (the system area 10b of) the disk 10, volatile memory 70, nonvolatile memory 80 and buffer memory 90 as the management table TB1. When the MPU 60 detects an error sector in the sectors Scn0 to Scn11 of the track TRn, if it cannot correct the error sector by the read retry or the sector ECC process, it cannot perform the track ECC process for the error sector of the track TRn.

In the example shown in FIG. 4, the MPU 60 sets the DOL toward the track TRn from the track TRn+1 (DOL in the outward direction) to a low DOL. In other words, the MPU 60 changes the DOL in the outward direction from a high DOL to a low DOL.

Figure 5:
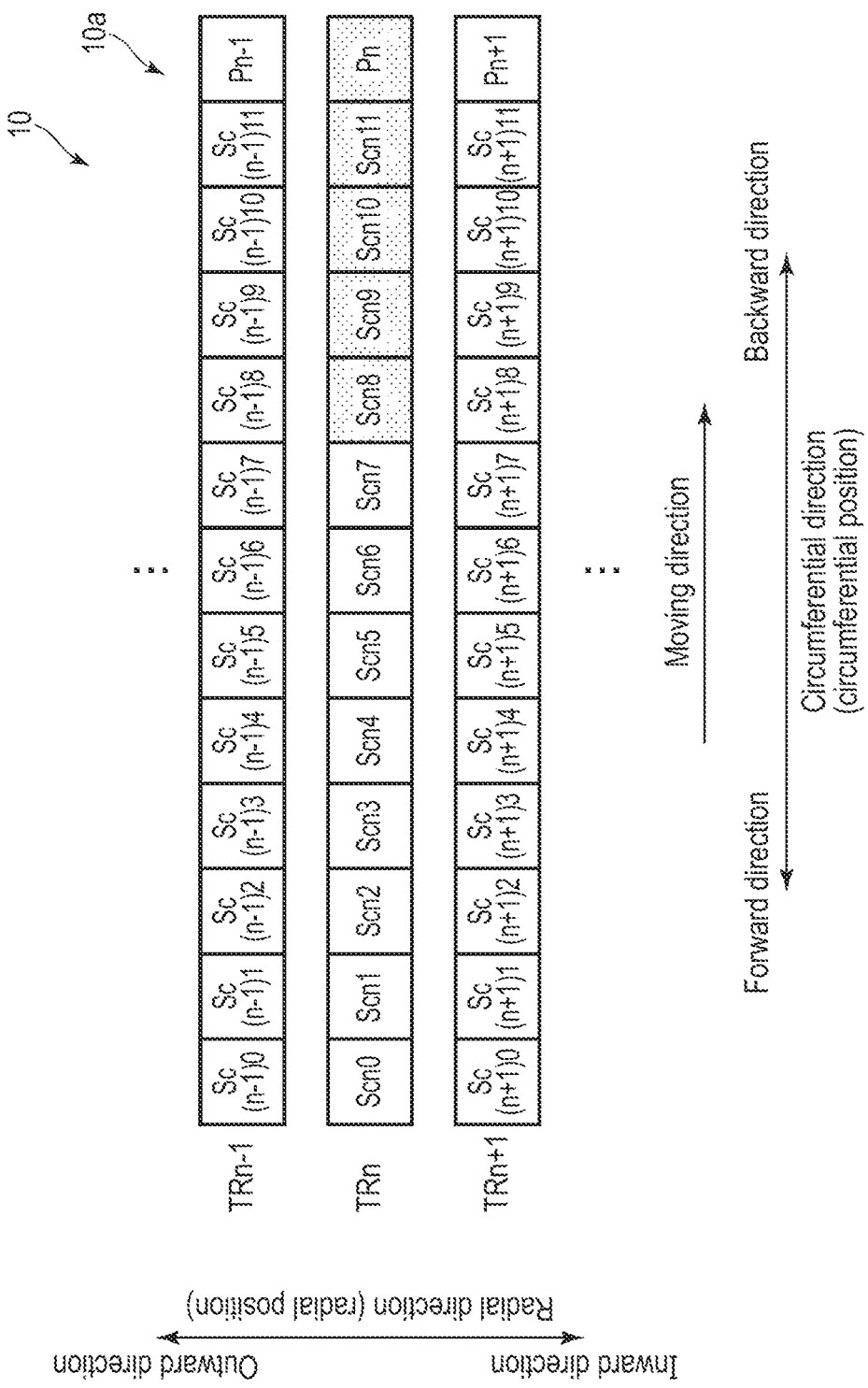
FIG. 5 is a schematic diagram showing an example of the track ECC process.

FIG. 5 is a schematic diagram showing an example of the track ECC process. FIG. 5 corresponds to FIG. 3.

In the example shown in FIG. 5, the MPU 60 overwrites rear sectors Scn8, Scn9, Scn10 and Scn11 of the track TRn. The MPU 60 performs an XOR operation for the rear sectors Scn8 to Scn11 to overwrite a parity sector Pm. The MPU 60 records the rear sectors Scn8 to Scn11 as correctable sectors in a predetermined recording area, such as (the system area 10b of) the disk 10, volatile memory 70, nonvolatile memory 80 and buffer memory 90 as the management table TB1. The MPU records front sectors Scn0 to Scn7 as uncorrectable sectors in a predetermined recording area, such as (the system area 10b of) the disk 10, volatile memory 70, nonvolatile memory 80 and buffer memory 90 as the management table TB1. When the MPU 60 detects an error sector in the rear sectors Scn8 to Scn11 of the track TRn, if it cannot correct the error sector by the read retry or the sector ECC process, it performs the track ECC process for the error sector based on the parity sector Pn to correct the error sector. When the MPU 60 detects an error sector in the front sectors Scn0 to Scn7 of the track TRn, if it cannot correct the error sector by the read retry or the sector ECC process, it cannot perform the track ECC process for the error sector of the track TRn.

In the example shown in FIG. 5, the MPU 60 sets the DOL toward the front sectors Scn0 to Scn7 of the track TRn from the front sectors Sc(n−1)0 to Sc(n−1)7 of the track TRn−1 (DOL in the inward direction) to a low DOL. In other words, the MPU 60 changes the DOL in the inward direction from a high DOL to a low DOL.

In the example shown in FIG. 5, the MPU 60 sets the DOL toward the front sectors Scn0 to Scn7 of the track TRn from the front sectors Sc(n+1)0 to Sc(n+1)7 of the track TRn+1 (DOL in the outward direction) to a low DOL. In other words, the MPU 60 changes the DOL in the outward direction from a high DOL to a low DOL.

Figure 6:
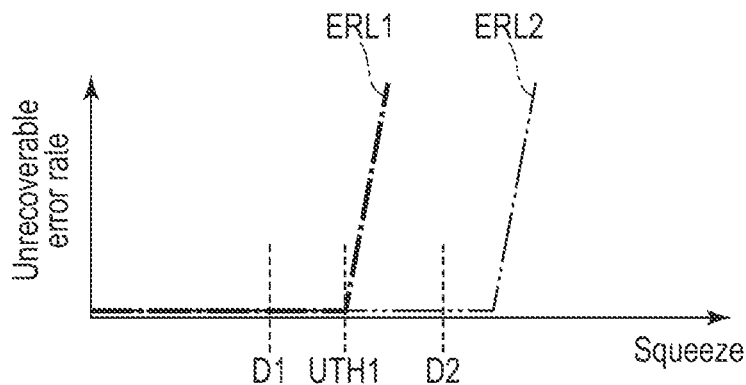
FIG. 6 is a schematic diagram showing an example of a low DOL, a high DOL and a low unrecoverable threshold value UTH1 according to the embodiment.

FIG. 6 is a schematic diagram showing an example of low DOL DL, high DOL D2 and a low unrecoverable threshold value UTH1 according to the embodiment. In FIG. 6, the horizontal axis indicates squeeze (or an off-track amount) and the vertical axis indicates an unrecoverable error rate. The unrecoverable error rate increases toward the direction of the arrow of the vertical axis. The squeeze increases toward the direction of the arrow of the horizontal axis. The low DOL D1, high DOL D2 and unrecoverable threshold value UTH1 are present on the horizontal axis. The high DOL D2 is greater than the low DOL D1. A low unrecoverable threshold value UTH1 corresponds to the low DOL D1. The low unrecoverable threshold value UTH1 is larger than the low DOL D1 and smaller than the high DOL D2. FIG. 6 also shows a change ERL1 in the unrecoverable error rate to the squeeze corresponding to the uncorrectable adjacent area (uncorrectable adjacent track, uncorrectable adjacent sectors, etc.) (which may be referred to as a change in the unrecoverable error rate corresponding to the uncorrectable adjacent area hereinafter) and a change ERL2 in the unrecoverable error rate to the squeeze corresponding to the correctable adjacent area (correctable adjacent track, correctable adjacent sector, etc.) (which may be referred to as a change in the unrecoverable error rate corresponding to the correctable adjacent area hereinafter). As is seen from the changes ERL1 and ERL2, the unrecoverable error rate in the correctable area increases with a smaller amount of squeeze than that in the uncorrectable area.

In the example shown in FIG. 6, the MPU 60 sets a low DOL to an uncorrectable adjacent track or an uncorrectable adjacent sector (in the direction toward the uncorrectable adjacent track or uncorrectable adjacent sector) and sets a high DOL to a correctable adjacent track or a correctable adjacent sector (in the direction toward the correctable adjacent track or correctable adjacent sector) in the target track or target sector. The MPU 60 sets a low unrecoverable threshold value UTH 1 to a correctable adjacent track or a correctable adjacent sector (in the direction toward the correctable adjacent track or the correctable adjacent sector) in the target track. When the MPU 60 determines that the off-track amount (or squeeze) for a correctable adjacent track or a correctable adjacent sector (in the direction toward the correctable adjacent track or the correctable adjacent sector) in the target track is larger than the low unrecoverable threshold value, it may perform a read modify write process for the correctable adjacent track or the correctable adjacent sector.

Figure 7:
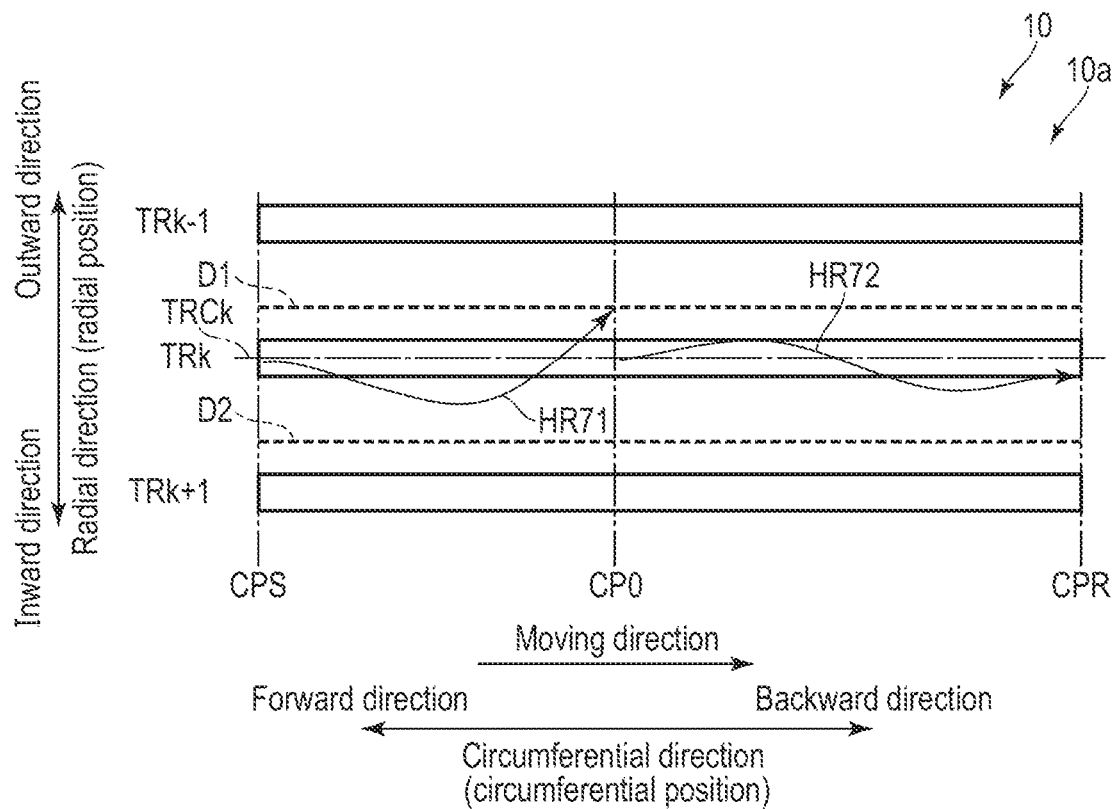
FIG. 7 is a schematic diagram showing an example of a DOL according to the embodiment.

FIG. 7 is a schematic diagram showing an example of the DOL according to the present embodiment. FIG. 7 shows tracks TRk−1, TRk and TRk+1. The tracks TRk−1 to TRk+1 are arranged in the order described toward the inward direction from the outward direction. The track TRk is adjacent to the track TRk−1 in the inward direction, and the track TRk+1 is adjacent to the track TRk in the outward direction. The track TRk−1 corresponds to an uncorrectable adjacent track, and the track TRk+1 corresponds to a correctable adjacent track. FIG. 7 also shows a track center TRCk of the track TRk and circumferential positions CPS, CP0 and CPR. The circumferential position CP0 is located in the backward direction from the circumferential position CPS, and the circumferential position CPR is located in the backward direction from the circumferential position CP0. In addition, FIG. 7 shows a path HR71 of the head 15 from the circumferential position CPS to the circumferential position CP0 on the track TRk, and a path HR72 of the head 15 from the circumferential position CP0 to the circumferential position CPR on the track TRk.

In the example shown in FIG. 7, in the track TRk, the MPU 60 sets the DOL toward the track TRk−1 (DOL in the outward direction) to a low DOL D1 and sets the DOL toward the track TRk+1 (DOL in the inward direction) to a high DOL D2.

In the example shown in FIG. 7, the MPU 60 moves the head 15 from the circumferential position CPS to the circumferential position CP0 in accordance with the path HR71 on the track TRk. When the MPU 60 determines that the off-track amount (squeeze) toward the track TRk−1 (the outward direction) is larger than the DOL D1 at the circumferential position CP0, it stops a write process (or a write operation) to reposition the head at the track center TRCk. When the MPU 60 stops the write process (or write operation) and positions the head 15 at the track center TRCk on the track TRk, it moves the head 15 from the circumferential position CP0 to the circumferential position CPR in accordance with the path HR72.

Figure 8:
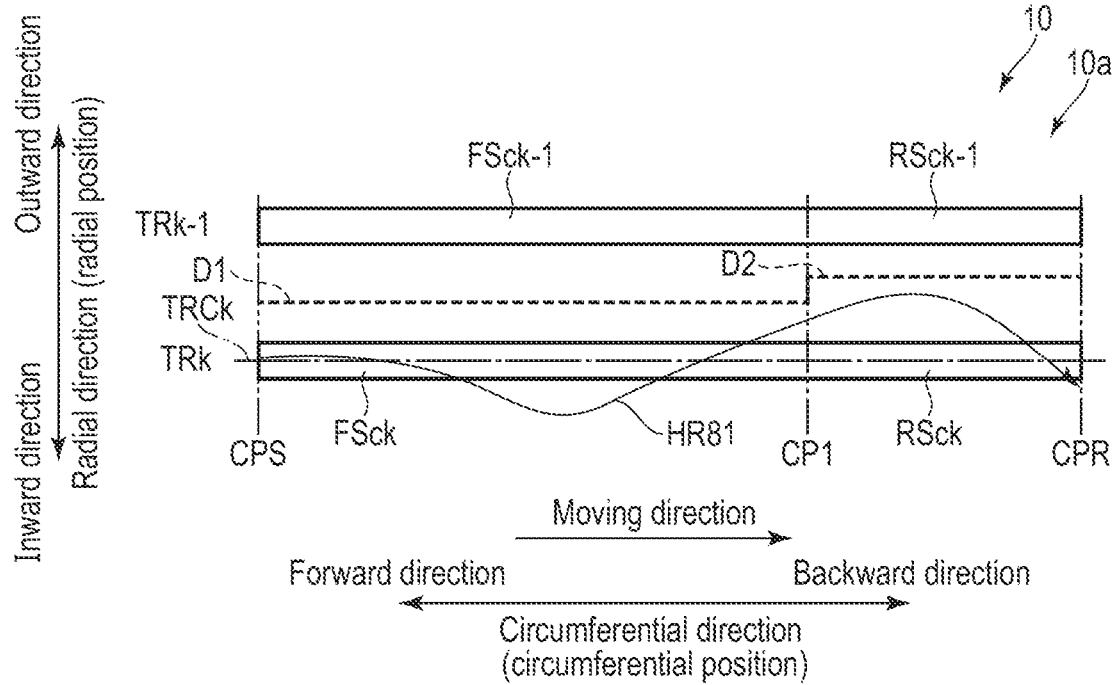
FIG. 8 is a schematic diagram showing an example of the DOL according to the embodiment.

FIG. 8 is a schematic diagram showing an example of the DOL according to the present embodiment. FIG. 8 shows a track TRk−1 and a track TRk. The track TRk−1 includes a front sector FSck−1 and a rear sector RSck−1 adjacent to the front sector FSck−1 in the backward direction. The front sector FSck−1 corresponds to an uncorrectable adjacent sector, and the rear sector RSck−1 corresponds to a correctable adjacent sector. The track TRk includes a front sector FSck and a rear sector RSck adjacent to the front sector FSck in the backward direction. FIG. 8 also shows circumferential positions CPS, CP1 and CPR. The circumferential position CP1 is located in the backward direction from the circumferential position CPS, and the circumferential position CPR is located in the backward direction from the circumferential position CP1. The front sector FSck−1 corresponds to an area from the circumferential position CPS to the circumferential position CP1 on the track TRk−1. The rear sector RSck−1 corresponds to an area from the circumferential position CP1 to the circumferential position CPR on the track TRk−1. The front sector FSck corresponds to an area from the circumferential position CPS to the circumferential position CP1 on the track TRk. The rear sector RSck corresponds to an area from the circumferential position CP1 to the circumferential position CPR on the track TRk. In addition, FIG. 8 shows a path HR81 of the head 15 from the circumferential position CPS to the circumferential position CPR on the track TRk.

In the example shown in FIG. 8, in the track TRk, the MPU 60 sets the DOL toward the front sector FSck−1 (DOL in the outward direction from the front sector FSck) to a low DOL D1 and sets the DOL toward the rear sector RSck−1 (DOL in the outward direction from the rear sector RSck) to a high DOL D2.

In the example shown in FIG. 8, the MPU 60 moves the head 15 from the circumferential position CPS to the circumferential position CPR in accordance with the path HR81 on the track TRk. When the MPU 60 determines that the off-track amount (squeeze) in the direction (outward direction) toward the front sector FSck−1 is equal to or less than the DOL D1 in the area from the circumferential position CPS to the circumferential position CP1 on the track TRk, it does not stop but continues the write process (or write operation). When the MPU 60 determines that the off-track amount (squeeze) in the direction toward the rear sector FSck−1 (outward direction) in the area from the circumferential position CP1 to the circumferential position CPR on the track TRk is equal to or less than the DOL D2, it does not stop but continues the write process (or write operation). In addition, when the MPU 60 determines that the off-track amount (squeeze) in the direction toward the rear sector FSck−1 (outward direction) in the area from the circumferential position CP1 to the circumferential position CPR on the track TRk is larger than the DOL D1 and not larger than the DOL D2, it does not stop but continues the write process (or write operation).

Figure 9:
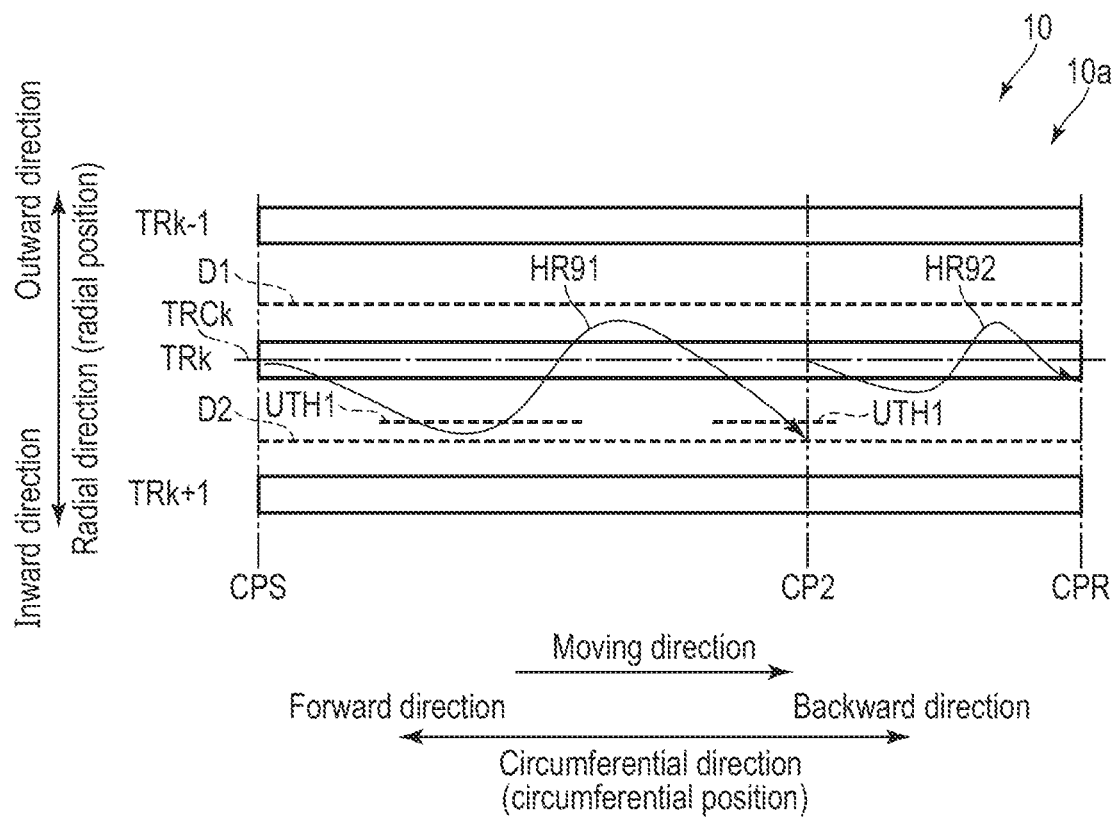
FIG. 9 is a schematic diagram showing an example of the DOL according to the embodiment.

FIG. 9 is a schematic diagram showing an example of the DOL according to the present embodiment. FIG. 9 shows tracks TRk−1, TRk and TRk+1, and circumferential positions CPS, CP2 and CPR. The circumferential position CP2 is located in the backward direction from the circumferential position CPS, and the circumferential position CPR is located in the backward direction from the circumferential position CP2. In addition, FIG. 9 shows a path HR91 of the head 15 from the circumferential position CPS to the circumferential position CP2 on the track TRk and a path HR92 of the head 15 from the circumferential position CP2 to the circumferential position CPR on the track TRk.

In the example shown in FIG. 9, on the track TRk, the MPU 60 sets the DOL toward the track TRk−1 (DOL in the outward direction) to a low DOL D1 and sets the DOL toward the track TRk+1 (DOL in the inward direction) to a high DOL D2. The MPU 60 also sets a low unrecoverable threshold value UTH1 to the track TRk+1 (in the inward direction) on the track TRk.

In the example shown in FIG. 9, the MPU 60 moves the head 15 from the circumferential position CPS to the circumferential position CP2 in accordance with the path HR91 on the track TRk. When the MPU 60 determines that the off-track amount (squeeze) in the direction toward the track TRk+1 (inward direction) is larger than the low unrecoverable threshold value UTH1, it performs a read modify write process for the track TRk+1. When the MPU 60 determines that the off-track amount (squeeze) in the direction toward the track TRk+1 (inward direction) at the circumferential position CP2 is equal to or larger than the DOL D2, it stops the write process (or write operation) to reposition the head 15 at the track center TRCk. When the MPU 60 stops the write process (or write operation) and positions the head 15 at the track center TRCk on the track TRk, it moves the head 15 from the circumferential position CP2 to the circumferential position CPR in accordance with the path HR92.

FIG. 10 is a flowchart showing an example of a DOL setting method according to the present embodiment.

The MPU 60 determines whether an area adjacent to a target area is a correctable area or not (B1001). For example, the MPU 60 determines whether a track adjacent to a target track is a correctable adjacent track or not and whether a sector adjacent to a target sector is a correctable adjacent sector or not. When the MPU 60 determines that the area adjacent to the target area is a correctable area (YES in B1001), it sets the DOL for the area adjacent to the target area to a high DOL (B1002). The MPU 60 sets a low unrecoverable threshold value to the area adjacent to the target area (B1003), and ends the process. When the MPU 60 determines that the area adjacent to the target area is an uncorrectable area (NO in B1001), it sets the DOL for the area adjacent to the target area to a low DOL (B1004) and ends the process.

FIG. 11 is a flowchart showing an example of the write process according to the present embodiment.

The MPU 60 receives a write command to write data to a target area (B1101). For example, the MPU 60 receives a write command to write data to a target track or a target sector. The MPU 60 determines whether the target area is a correctable area or not (B1102). For example, the MPU 60 determines whether the target track is a correctable track or not and whether the target sector is a correctable sector or not.

When the MPU 60 determines that the target area is not a correctable area (NO in B1102), it writes data to the target area (B1103) and ends the process. For example, when the MPU 60 determines that the target track is not a correctable track or that the target sector is not a correctable sector, it writes data to the target track or the target sector and ends the process.

When the MPU 60 determines that the target area is a correctable area (YES in B1102), it determines whether the squeeze in a direction toward the target area in an area adjacent to the target area is larger than the low unrecoverable threshold value or not (B1104). For example, when the MPU 60 determines that the target sector is a correctable sector or the target track is a correctable track, it determines whether the squeeze in a direction toward the target sector or the target track in a sector adjacent to the target sector or a track adjacent to the target track is larger than the low unrecoverable threshold value or not.

When the MPU 60 determines that the squeeze in a direction toward the target sector or the target track in the adjacent sector or the adjacent track is equal to or smaller than the low unrecoverable threshold value (No in B1104), it proceeds to the process in B1103. When the MPU 60 determines that the squeeze in a direction toward the target sector or the target track in the adjacent sector or the adjacent track is larger than the low unrecoverable threshold value (Yes in B1104), it performs a read modify write process (B1105) without allowing a write process in which an error cannot be corrected for each track in the target sector or the target track, such as a sequential write process performed to the middle of one track and a random write process, and ends the process. For example, when the MPU 60 determines that the squeeze in a direction toward the target sector or the target track in the adjacent sector or the adjacent track is larger than the low unrecoverable threshold value, it performs a read modify write process without allowing a random write process to be performed for the target sector or the target track, and ends the process. For example, when the MPU 60 determines that the squeeze in a direction toward the target sector or the target track in the adjacent sector or the adjacent track is larger than the low unrecoverable threshold value, it reads the target sector or the target track, writes an update sector or an update track in which data corresponding to the target sector or the target track is replaced with update data, performs an XOR operation for all update sector groups of the update sector or the update track to calculate an update parity sector, write the update sector groups and the update parity sector to the same target sector or the target track, and ends the process.

According to the present embodiment, the magnetic disk device 1 manages a correctable area (correctable track or correctable sector) and an uncorrectable area (uncorrectable track or uncorrectable sector) in the management table TB1. A magnetic disk device 1 manages a random write inhibit track or a random write inhibit sector in the random write inhibit table TB2. When the magnetic disk device 1 determines that an area adjacent to a target area is a correctable adjacent area, it sets the DOL of the target area in a direction toward the adjacent area to a high DOL. When the magnetic disk device 1 determines that the adjacent area is an uncorrectable adjacent area, it sets the DOL of the target area in the direction toward the adjacent area to a low DOL. The magnetic disk device 1 sets a low unrecoverable threshold value to the adjacent area where a high DOL is set in the target area. When the magnetic disk device 1 determines that the adjacent area of the target area is a correctable area and that the squeeze in a direction toward the adjacent area is larger than the low unrecoverable threshold value, it performs a read modify write process for the adjacent area without allowing a write process in which an error cannot be corrected for each track in the adjacent area, such as a sequential write process performed to the middle of one track and a random write process. The magnetic disk device 1 can thus improve in its recording density. In addition, the magnetic disk device 1 can efficiently perform the write process. Therefore, the magnetic disk device 1 can be improved in its reliability.

Next is a description of a magnetic disk device according to a modification of the above-described embodiment. In the modification, the same components as those of the above-described embodiment are denoted by the same reference numerals and their detailed descriptions will be omitted.

First Modification

A magnetic disk device 1 according to a first modification differs from the magnetic disk device 1 according to the foregoing embodiment in that the device performs a refresh process.

Figure 12:
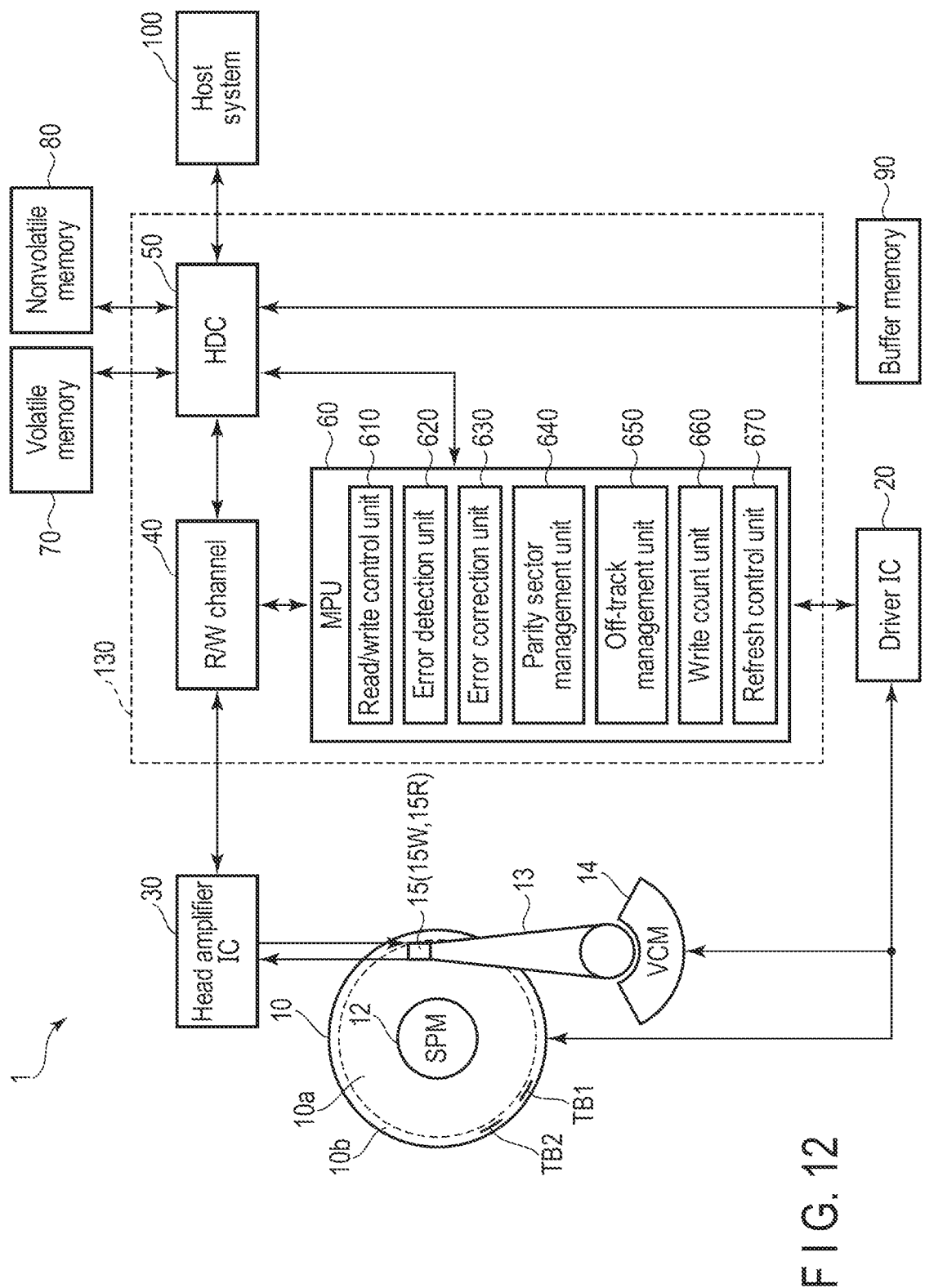
FIG. 12 is a block diagram showing a configuration of a magnetic disk device according to a first modification.

FIG. 12 is a block diagram showing a configuration of the magnetic disk device 1 according to the first modification.

The MPU 60 further includes a write count unit 660 and a refresh control unit 670. The MPU 60 performs on firmware a process of each of the units, such as the read/write control unit 610, error detection unit 620, error correction unit 630, parity sector management unit 640, off-track management unit 650, write count unit 660 and refresh control unit 670. Note that the MPU 60 may include each of the units 610, 620, 630, 640, 650, 660 and 670 as a circuit. The units 610, 620, 630, 640, 650, 660 and 670 and the like may be included in the R/W channel 40 or the HDC 50. Note that the MPU 60 may not include the off-track management unit 650.

The write count unit 660 counts the number of times data is written (which may be referred to as a write number or a write count hereinafter). The write number (or write count) corresponds to, for example, the number of times of adjacent track interference (ATI) of leakage flux or the like from the head 15 that writes data. The write count unit 660 may hold the write number in a predetermined recording area, such as (the system area 10b of) the disk 10, the volatile memory 70, the nonvolatile memory 80 and the buffer memory 90, as the management table TB1.

The write count unit 660 counts the number of times data is written to an area located within a predetermined range in the radial direction from a target area (which may be referred to as a proximity area hereinafter). For example, the write count unit 660 counts the number of times data is written to a proximity area located within a range that receives ATI from a target area.

When data is written to the proximity area of a target area, the write count unit 660 increments the write number corresponding to the target area by a predetermined value. For example, when data is written to the proximity areas of a target area in its outward and inward directions, the write count unit 660 increments the write number corresponding to the target area by a predetermined value. For example, when data is written to the proximity areas of a target area in its outward and inward directions, the write count unit 660 increments the write number corresponding to the target area by one.

The write count unit 660 counts the number of times data is written to an area that is radially adjacent to a target area (which may be referred to as an adjacent area hereinafter). For example, the write count unit 660 counts the number of times data is written to an adjacent area located within a range that receives ATI from a target area.

When data is written to an area adjacent to a target area, the write count unit 660 increments the write number corresponding to the target area by a predetermined value. For example, when data is written to the adjacent areas of a target area in its outward and inward directions, the write count unit 660 increments the write number corresponding to the target area by a predetermined value. For example, when data is written to the adjacent areas of a target area in its outward and inward directions, the write count unit 660 increments the write number corresponding to the target area by one. Note that when data is written to the adjacent areas of a target area in its outward and inward directions, the write count unit 660 may increment the write number corresponding to the target area in accordance with the amount of squeeze. For example, when data is written to the adjacent areas of a target area in its outward and inward directions, the write count unit 660 may increment the write number corresponding to the target area by a value larger than one, which corresponds to the amount of squeeze.

The write count unit 660 counts the number of times data is written to a track adjacent to a target track or a sector adjacent to a target sector in the radial direction of the target track or sector.

When data is written to a track adjacent to a target track or a sector adjacent to a target sector, the write count unit 660 increments the write number corresponding to the target track or sector by a predetermined value. For example, when data is written to tracks adjacent to a target track or sector in its outward and inward directions, the write count unit 660 increments the write number corresponding to the target track or sector by a predetermined value. For example, when data is written to tracks adjacent to a target track or sectors adjacent to a target sector in the outward and inward directions of the target track or sector, the write count unit 660 increments the write number corresponding to the target track or sector by one.

The refresh control unit 670 performs a process of rewriting the same data as data, which is written to a predetermined area, such as a predetermined track, to the predetermined area (which may be referred to as a refresh process). When the refresh control unit 670 determines that the write number corresponding to a predetermined area exceeds a threshold value (which may be referred to as a refresh threshold value) corresponding to the write number for performing the refresh process, it performs the refresh process in this area. When the refresh control unit 670 determines that the write number corresponding to a predetermined area exceeds the refresh threshold value, it performs the refresh process for part of the area. In other words, when the refresh control unit 670 determines that the write number corresponding to a predetermined area exceeds the refresh threshold value, it performs the refresh process for data whose capacity is equal to or smaller than the capacity set as a format in this area in advance. When the refresh control unit 670 performs a refresh process in a predetermined area, the refresh control unit 670 resets the write number corresponding to the area to, for example, 0.

When the refresh control unit 670 determines that the write number corresponding to a target track or a target sector exceeds a refresh threshold value corresponding to the target track or target sector, it performs a refresh process for the target track or target sector. When the refresh control unit 670 determines that the write number corresponding to a target track or a target sector exceeds a refresh threshold value corresponding to the target track or target sector, it performs a refresh process for part of the target track or target sector. In other words, when the refresh control unit 670 determines that the write number corresponding to a target track or a target sector exceeds a threshold value corresponding to the target track or target sector, it performs a refresh process for data whose capacity is equal to or smaller than the capacity preset as a format for the target track or target sector.

The refresh control unit 670 changes (or sets) a refresh threshold value. The refresh control unit 670 has a plurality of refresh threshold values.

The refresh control unit 670 changes (or sets) the refresh threshold value of a correctable area to a refresh threshold value that is higher than the currently-set refresh threshold value of the refresh threshold values (which may be referred to as the current refresh threshold value). The refresh control unit 670 changes (or sets) the refresh threshold value of an uncorrectable area to a refresh threshold value that is lower than the current refresh threshold value of the refresh threshold values.

In addition, the refresh control unit 670 sets the refresh threshold value of a correctable area to a refresh threshold value that is higher than the refresh threshold value of an uncorrectable area among the refresh threshold values, and sets the refresh threshold value of an uncorrectable area to a refresh threshold value that is lower than the refresh threshold value of a correctable area among the refresh threshold values.

The refresh control unit 670 has two refresh threshold values, such as a high refresh threshold value and a low refresh threshold value. Note that the refresh control unit 670 may have three or more refresh threshold values. The high refresh threshold value is larger than the low refresh threshold value, and the low refresh threshold value is smaller than the high refresh threshold value. The refresh control unit 670 sets the refresh threshold value of a correctable area to a high refresh threshold value and sets the refresh threshold value of an uncorrectable area to a low refresh threshold value. The refresh control unit 670 performs a refresh process for an uncorrectable area to which a low refresh threshold value is set, with a lower frequency than for a correctable area to which a high refresh threshold value is set. In other words, the refresh control unit 670 performs a refresh process for a correctable area to which a high refresh threshold value is set, with a higher frequency than for an uncorrectable area to which a low refresh threshold value is set. The frequency corresponds to, for example, the number of times the process is performed for a specific period of time.

For example, the refresh control unit 670 sets the refresh threshold value of a correctable track or a correctable cylinder to a high refresh threshold value and sets the refresh threshold value of an uncorrectable track or an uncorrectable cylinder to a low refresh threshold value.

For example, the refresh control unit 670 sets the refresh threshold value of a correctable sector (or a logical track) to a high refresh threshold value and sets the refresh threshold value of an uncorrectable sector to a low refresh threshold value.

The refresh control unit 670 may set different refresh threshold values to the tracks corresponding to a plurality of heads 15 corresponding to a predetermined cylinder (track). Note that the refresh control unit 670 may set the same refresh threshold value to the tracks corresponding to a plurality of heads 15 corresponding to a predetermined cylinder (track).

For example, in order to maintain the constant performance of a plurality of heads 15 for a predetermined cylinder (track), the refresh control unit 670 sets the refresh threshold value of a cylinder (track) corresponding to at least one of the heads 15 to a high refresh threshold value, and sets the refresh threshold values of cylinders (tracks) corresponding to the heads 15 other than said at least one of the heads to low refresh threshold values.

For example, when the refresh control unit 670 maintains the constant performance of four heads 15 for a predetermined cylinder (track) and the refresh threshold values of four cylinders (tracks) corresponding to the four heads 15 are each 300 times, two refresh threshold values corresponding to two correctable cylinders (correctable tracks) corresponding to two heads 15 of the four heads 15 are increased by 100 times. In this case, the refresh control unit 670 decreases by 100 times two refresh threshold values corresponding to two cylinders (tracks) corresponding to the remaining two heads 15 of the four heads. In this case, the TPI of the two heads 15 not corresponding to the correctable cylinders (correctable tracks) can be improved while maintaining the performance of the four heads 15. When the remaining two heads 15 is adapted to a write process in which an error cannot be corrected for each track, such as a sequential write process performed to the middle of one track, or two uncorrectable cylinders (uncorrectable tracks) that are randomly written, the refresh control unit 670 maintains each of the two refresh threshold values corresponding to the two cylinders (tracks) corresponding to the two heads 15 at 300 times. The "randomly write to a predetermined track, such as a correctable track (correctable cylinder)" corresponds to "write in units not larger than the unit for executing error correction in units of tracks". Therefore, an error cannot be corrected for each unit by performing a random write process for a predetermined track, such as a correctable track (correctable cylinder). When the write number of the correctable cylinder (correctable track) is equal to or larger than the refresh threshold value of the uncorrectable cylinder (uncorrectable track), the refresh control unit 670 does not permit any random write process for the correctable cylinder (correctable track) but performs a read modify write process for the correctable cylinder (correctable track) to maintain the correctable track because the correctable cylinder (correctable track) becomes an uncorrectable track when a random write process is performed for the correctable cylinder (correctable track).

FIG. 13 is a schematic diagram showing an example of refresh threshold values LTH and HTH according to the first modification. In FIG. 13, the horizontal axis indicates the write number (the number of times), and the vertical axis indicates an unrecoverable error rate. In the vertical axis, the unrecoverable error rate increases toward the direction of the arrow. In the horizontal axis, the write number increases toward the direction of the arrow. A low refresh threshold value LTH and a high refresh threshold HTH are present on the horizontal axis. FIG. 13 also shows a change ERL3 in the unrecoverable error rate corresponding to an uncorrectable area and a change ERL4 in the unrecoverable error rate corresponding to a correctable area. As is seen from the changes ERL3 and ERL4, the unrecoverable error rate for the write number in the correctable area is lower than that in the uncorrectable area.

In the example shown in FIG. 13, the MPU 60 sets a high refresh threshold value to the correctable area and sets a low refresh threshold value to the uncorrectable area. The MPU 60 sets a high TPI to a head 15 corresponding to the uncorrectable area. When the MPU 60 determines that the write number corresponding to the correctable area exceeds the high refresh threshold value HTH, it performs a refresh process for the correctable area. When the MPU 60 determines that the write number corresponding to the uncorrectable area exceeds the low refresh threshold value LTH, it performs a refresh process for the uncorrectable area. The frequency with which the MPU 60 performs a refresh process for the uncorrectable area is higher than the frequency with which the MPU 60 performs a refresh process for the correctable area.

FIG. 14 is a flowchart showing an example of a refresh threshold value setting method according to the present embodiment.

The MPU 60 determines whether a predetermined area is a correctable area or not (B1401). In other words, the MPU 60 determines whether a predetermined area is a correctable area or an uncorrectable area. For example, the MPU 60 determines whether a predetermined track is a correctable track or an uncorrectable track. For example, the MPU 60 determines whether a predetermined sector is a correctable sector or an uncorrectable sector. When the MPU 60 determines that a predetermined area is a correctable area (Yes in B1401), it sets a high refresh threshold value to the correctable area (B1402), and ends the process. In other words, the MPU 60 sets a high refresh threshold value to the correctable track (or the correctable cylinder). The MPU 60 sets a high refresh threshold value to the correctable sector.

When the MPU 60 determines that a predetermined area is an uncorrectable area (No in B1401), it sets a low refresh threshold value to the uncorrectable area (B1403), and ends the process. In other words, the MPU sets a low refresh threshold value to the uncorrectable track (or the uncorrectable cylinder). The MPU 60 sets a low refresh threshold value to the uncorrectable sector.

FIG. 15 is a flowchart showing an example of a write process for a correctable area according to the present embodiment.

The MPU 60 receives a write command to write data to a correctable area (B1501). For example, the MPU 60 receives a write command to write data to a correctable track (or a correctable cylinder). The MPU 60 determines whether the write number for the correctable area is larger than the low refresh threshold value or not (B1502). For example, the MPU 60 determines whether the write number for the correctable track (or the correctable cylinder) is larger than the low refresh threshold value or not. When the MPU 60 determines that the write number for the correctable area is not larger than the low refresh threshold value (NO in B1502), it writes data to the correctable area (B1503) and ends the process. For example, when the MPU 60 determines that the write number for the correctable track is not larger than the low refresh threshold value, it writes data to the correctable track and ends the process.

When the MPU 60 determines that the write number for the correctable area is larger than the low refresh threshold value (Yes in B1502), it performs a read modify write process (B1504) without permitting a write process in which an error cannot be corrected for each track in the correctable area, such as a sequential write process to the middle of one track and a random write process, and ends the process. For example, when the MPU 60 determines that the write number for a correctable track (or a correctable cylinder) is larger than the low refresh threshold value, it performs a read modify write process without permitting a random write process for the correctable track (or the correctable cylinder). For example, when the MPU 60 determines that the write number for the correctable track (or the correctable cylinder) is larger than the low refresh threshold value, it reads the correctable track, writes an update track (or an update cylinder) in which data instructed to be written in response to a write command is replaced with corresponding data of the correctable track (or the correctable cylinder), performs an XOR operation for all update sector groups of the update track (or the update cylinder) to calculate an update parity sector, writes the update sector group and the update parity sector in the same track or cylinder, and ends the process.

According to the first modification, the magnetic disk device 1 changes a refresh threshold value corresponding to each of the cylinders on the surfaces of a plurality of disks 10 corresponding to their respective heads 15. The magnetic disk device 1 has a high refresh threshold value and a low refresh threshold value. The magnetic disk device 1 sets a high refresh threshold value to the correctable area and sets a low refresh threshold value to the uncorrectable area. The frequency with which the magnetic disk device 1 performs a refresh process for the uncorrectable area set to a low refresh threshold value is lower than the frequency with which the magnetic disk device 1 performs a refresh process for the correctable area set to a high refresh threshold value. When the magnetic disk device 1 writes data to the correctable area, if the write number for the correctable area is larger than the low refresh threshold value, the magnetic disk device 1 performs a read modify write process for the correctable area. The magnetic disk device 1 can thus improve in its TPI and accordingly improve in its recording density.

Second Modification

A magnetic disk device 1 according to a second modification differs from the magnetic disk device 1 according to the first modification in that data of a track which cannot be subjected to a track ECC process is saved.

FIG. 16 is a block diagram showing a configuration of the magnetic disk device 1 according to the second modification.

The MPU 60 further includes a data saving unit 680. The MPU 60 performs on firmware a process of each of the units, such as the read/write control unit 610, error detection unit 620, error correction unit 630, parity sector management unit 640, off-track management unit 650, write count unit 660, refresh control unit 670 and data saving unit 680. Note that the MPU 60 may include each of the units 610, 620, 630, 640, 650, 660, 670 and 680 as a circuit. The units 610, 620, 630, 640, 650, 660, 670 and 680 and the like may be included in the R/W channel 40 or the HDC 50. Note that the MPU may not include at least one of the write count unit 660 and the refresh control unit 670.

The data saving unit 680 records data, which is indicated by a command received from the host 100 or the like, in a recording area other than the recording area indicated by the command (which may be referred to as another recording area hereinafter), such as the disk 10, volatile memory 70, nonvolatile memory 80 and buffer memory 90. The data saving unit 680 temporarily records data, which is indicated by a command received from the host 100 or the like, in another recording area, such as the disk 10, volatile memory 70, nonvolatile memory 80 and the buffer memory 90. Hereinafter, "temporarily recording data in another recording area" may be referred to as "saving" and "performing a saving process".

Upon receiving from the host 100 or the like a write command to a random write inhibit area, such as a random write inhibit track and a random write inhibit sector (which may be referred to as an inhibit area write command hereinafter), the data saving unit 680 determines whether another recording area includes a free area.

When the data saving unit 680 determines that another recording area includes a free area, it saves the inhibit area write command and its corresponding data (which may be referred to as inhibit area command data hereinafter) in another recording area, and does not perform the inhibit area write command but stops or temporarily holds it. In other words, when the data saving unit 680 determines that another recording area includes a free area, if it receives the inhibit area write command from the host 100 or the like, it saves an inhibit area write command and its corresponding inhibit area command data, and does not perform a write process of the random write inhibit track but stops or temporarily holds it.

When the data saving unit 680 determines that another recording area includes a free area, it saves the inhibit area write command, its corresponding inhibit area command data and random write inhibit track data (which may be referred to as random write inhibit data hereinafter) in another recording area, and does not perform the inhibit area write command but stops or temporarily holds it. In other words, when the data saving unit 680 determines that another recording area includes a free area, if it receives the inhibit area write command from the host 100 or the like, it saves the inhibit area write command, its corresponding inhibit area command data and random write inhibit data corresponding to the random write inhibit track, and does not perform a write process of the random write inhibit track but stops or temporarily holds it.

When the data saving unit 680 determines that another recording area includes a free area, it writes a random write inhibit track corresponding to the inhibit area write command such that a track ECC process can be performed for the random write inhibit track based on inhibit area command data corresponding to the inhibit area write command. In other words, when the data saving unit 680 determines that another recording area includes a free area, it writes a random write inhibit track corresponding to the inhibit area write command such that the random write inhibit track can be corrected based on inhibit area command data corresponding to the inhibit area write command.

When the data saving unit 680 receives an inhibit area write command from the host 100 or the like and determines that another recording area includes no free area, it writes inhibit area command data corresponding to the inhibit area write command to an area designated by the inhibit area write command, such as a random write inhibit track, and sets the area designated by the inhibit area write command, such as a random write inhibit track, to an uncorrectable track in the user data area 10a of the disk 10. In other words, when the data saving unit 680 receives an inhibit area write command from the host 100 or the like and determines that another recording area includes no free area, it writes inhibit area command data to an area corresponding to the inhibit area write command, such as a random write inhibit track, and manages the area corresponding to the inhibit area write command, such as a random write inhibit track, in the management table TB1 as an uncorrectable track in the user data area 10a of the disk 10.

For example, when the data saving unit 680 receives an inhibit area write command from the host 100 or the like, it determines whether there is a free area in a cache for temporarily recording data, such as the system area 10b of the disk 10, volatile memory 70, nonvolatile memory 80 and buffer memory 90.

When the data saving unit 680 determines that the cache includes a free area, it saves inhibit area command data corresponding to the inhibit area write command in the cache, and does not perform the random write inhibit track write process but stops or temporarily holds it.

When the data saving unit 680 determines that the cache includes a free area, it saves inhibit area command data corresponding to the inhibit area write command and random write inhibition data of a random write inhibit track corresponding to the inhibit area write command in the cache, and does not perform the random write inhibit track write process but stops or temporarily holds it.

When the data saving unit 680 saves inhibit area command data (update data) corresponding to the inhibit area write command in the cache during idle time or the like, it performs a read modify write process for the random write inhibit track based on the inhibit area command data (update data) and the random write inhibit data.

When the data saving unit 680 saves inhibit area command data (update data) corresponding to the inhibit area write command and random write inhibit data of random write inhibit track corresponding to the inhibit area write command in the cache during idle time or the like, it performs a read modify write process for the random write inhibit track based on the inhibit area command data (update data) and the random write inhibit data.

When the data saving unit 680 further receives from the host 100 or the like a command (which may be referred to as a write inhibit residual command hereinafter) to write data (which may be referred to as write inhibit residual data hereinafter) to a residual area (which may be referred to as a write inhibit residual area hereinafter) excluding the area to write inhibit area command data from the random write inhibit track, it writes the write inhibit residual data and the inhibit area command data to the random write inhibit track of the user data area 10*a* of the disk 10. In other words, when the data saving unit 680 receives at least one command for writing data for one random write inhibit track (which may be referred to as a one-track command hereinafter) from the host 100 or the like, it writes data corresponding to the one-track command to the random write inhibit track in the user data area 10*a* of the disk 10.

When the data saving unit 680 receives an inhibit area write command from the host 100 or the like and determines that the cache includes no free area, it writes an inhibit area command data corresponding to the inhibit area write command to an area designated by the inhibit area write command, such as a random write inhibit track, and sets an area designated by the inhibit area write command, such as a random write inhibit track, to an uncorrectable track.

When the data saving unit 680 receives from the host 100 or the like a write command (which may be referred to as an uncorrectable command hereinafter) by which a track ECC process cannot be performed for a predetermined correctable track (which may be referred to as an uncorrectable scheduled track hereinafter), it determines whether another recording area includes a free area.

When the data saving unit 680 determines that another recording area includes a free area, it saves the uncorrectable command and its corresponding data (which may be referred to as uncorrectable command data hereinafter) in another recording area, and does not execute the uncorrectable command but stops or temporarily holds it. In other words, when the data saving unit 680 determines that another recording area includes a free area, it saves the uncorrectable command, its corresponding uncorrectable command data and uncorrectable scheduled data of the uncorrectable scheduled track, and does not perform a write process for the uncorrectable scheduled track but stops or temporarily holds it.

When the data saving unit 680 determines that another recording area includes a free area, it saves the uncorrectable command, its corresponding uncorrectable command data, and data of the uncorrectable scheduled track in another recording area, and does not execute the uncorrectable command but stops or temporarily holds it. In other words, when the data saving unit 680 determines that another recording area includes a free area, it saves the uncorrectable command, its corresponding uncorrectable command data, and uncorrectable scheduled data of the uncorrectable scheduled track, and does not perform a write process for the uncorrectable scheduled track but stops or temporarily holds it.

When the data saving unit 680 determines that another recording area includes a free area, it writes an uncorrectable scheduled track corresponding to the uncorrectable command such that a track ECC process can be performed in the uncorrectable scheduled track, based on uncorrectable command data corresponding to the uncorrectable command. In other words, when the data saving unit 680 determines that another recording area includes a free area, it writes an uncorrectable scheduled track corresponding to the uncorrectable command such that the uncorrectable scheduled track becomes a correctable track, based on the uncorrectable command data corresponding to the uncorrectable command.

When the data saving unit 680 receives an uncorrectable command from the host 100 or the like and determines that another recording area includes no free area, it writes uncorrectable command data corresponding to the uncorrectable command to an uncorrectable scheduled track and sets the uncorrectable scheduled track to an uncorrectable track in the user data area 10*a* of the disk 10. In other words, when the data saving unit 680 receives an uncorrectable command from the host 100 or the like and determines that another recording area includes no free area, it writes uncorrectable command data corresponding to the uncorrectable command to an uncorrectable scheduled track, and manages the uncorrectable scheduled track in the management table TB1 as an uncorrectable track in the user data area 10*a* of the disk 10.

For example, when the data saving unit 680 receives an uncorrectable command from the host 100 or the like, it determines whether there is a free area in the cache, such as the system area 10*b* of the disk 10, volatile memory 70, nonvolatile memory 80 and the buffer memory 90.

When the data saving unit 680 determines that the cache includes a free area, it saves uncorrectable command data corresponding to the uncorrectable command in a cache for temporarily recording data, and does not perform a write process for the uncorrectable scheduled track but stops or temporarily holds it.

When the data saving unit 680 determines that the cache includes a free area, it saves uncorrectable command data corresponding to the uncorrectable command and uncorrectable scheduled data of an uncorrectable scheduled track corresponding to the uncorrectable command in a cache for temporarily recording data, and does not perform a write process for the uncorrectable scheduled track but stops or temporarily holds it.

When the data saving unit 680 saves uncorrectable command data (update data) corresponding to the uncorrectable command in the cache during idle time or the like, it performs a read modify write process for the uncorrectable scheduled track based on the uncorrectable command data (update data).

When the data saving unit 680 saves uncorrectable command data (update data) corresponding to the uncorrectable command and uncorrectable scheduled data of an uncorrectable scheduled track corresponding to the uncorrectable command in a cache during idle time or the like, it performs a read modify write process for the uncorrectable scheduled track based on the uncorrectable command data (update data) and the uncorrectable scheduled data.

When the data saving unit 680 further receives from the host 100 or the like a command (which may be referred to as an uncorrectable residual command hereinafter) to write data (which may be referred to as uncorrectable residual data hereinafter) to a residual area (which may be referred to as an uncorrectable residual area hereinafter) excluding the area to write uncorrectable command data from the uncorrectable scheduled track, it writes the uncorrectable residual data and the uncorrectable command data to the uncorrectable scheduled track of the user data area 10*a* of the disk 10.

In other words, when the data saving unit 680 receives a command for one uncorrectable scheduled track from the host 100 or the like, it writes data corresponding to the one-track command to the uncorrectable scheduled track in the user data area of the disk 10.

When the data saving unit 680 receives an uncorrectable command from the host 100 or the like and determines that the cache includes no free area, it writes uncorrectable command data corresponding to the uncorrectable command to an uncorrectable scheduled track and sets the uncorrectable scheduled track to an uncorrectable track.

Figure 17:
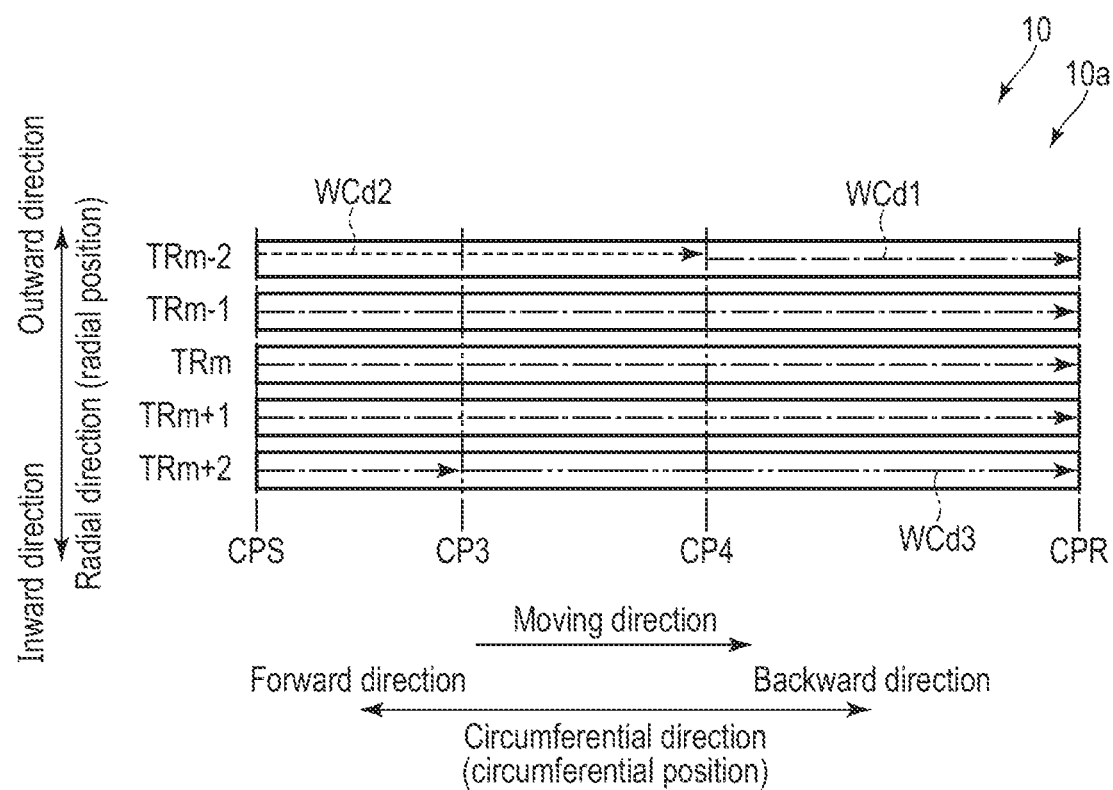
FIG. 17 is a schematic diagram showing an example of a saving process according to the second modification.

FIG. 17 is a schematic diagram showing an example of the saving process according to the second modification. FIG. 17 shows tracks TRm−2, TRm+1, TRm, TRm+1 and TRm+2. In FIG. 17, the tracks TRm to 2 to TRk+2 are arranged in the order described from the outward direction to the inward direction. The track TRm−1 is adjacent to the track TRm in the outward direction. The track TRm−2 is adjacent to the track TRm−1 in the outward direction. The track TRm+1 is adjacent to the track TRm in the inward direction. The track TRm+2 is adjacent to the track TRm+1 in the inward direction. In FIG. 17, tracks TRm−2 to TRm+2 correspond to correctable tracks. FIG. 17 also shows circumferential positions CPS, CP3, CP4 and CPR. The circumferential position CP3 is located in the backward direction from the circumferential position CPS, the circumferential position CP4 is located in the backward direction from the circumferential position CP3, and the circumferential position CPR is located in the backward direction from the circumferential position CP4. FIG. 17 also shows areas WCd1, WCd2 and WCd3 each of which is written by a predetermined write command. Hereinafter, "a command for writing a predetermined area or data" and "an area or data to be written by a predetermined write command" may be referred to as a "write command". That is, "a command for writing an area or data WCd1" and "an area or data WCd1 to be written by a predetermined write command" will be referred to as "write command WCd1", "a command for writing an area or data WCd2" and "an area or data WCd2 to be written by a predetermined write command" will be referred to as "write command WCd2" and "a command for writing an area or data WCd3" and "an area or data WCd3 to be written by a predetermined write command" will be referred to as "write command WCd3". The write command WCd1 corresponds to an area or data from the circumferential position CP4 to the circumferential position CPR in the track TRm−2, an area or data from the circumferential position CPS to the circumferential position CPR in the track TRm−1, an area or data from the circumferential position CPS to the circumferential position CPR in the track TRm, an area or data from the circumferential position CPS to the circumferential position CPR in the track TRm+1, and an area or data from the circumferential position CPS to the circumferential position CP3 in the track TRm+2. In addition, the write command WCd1 corresponds to a command for writing data to an area from the circumferential position CP4 to the circumferential position CPR in the track TRm−2, a command for writing data to an area from the circumferential position CPS to the circumferential position CPR in the track TRm−1, a command for writing data to an area from the circumferential position CPS to the circumferential position CPR in the track TRm, a command for writing data to an area from the circumferential position CPS to the circumferential position CPR in the track TRm+1, and a command for writing data to an area from the circumferential position CPS to the circumferential position CP3 in the track TRm+2. The write command WCd2 corresponds to an area or data from the circumferential position CPS to the circumferential position CP4 in the track TRm−2. The write command WCd2 corresponds to a command for writing data to an area from the circumferential position CPS to the circumferential position CP4 in the track TRm−2. The write command WCd3 corresponds to an area or data from the circumferential position CP3 to the circumferential position CPR in the track TRm+2. The write command WCd3 corresponds to a command for writing data to an area from the circumferential position CP3 to the circumferential position CPR in the track TRm+2.

In the example shown in FIG. 17, when the MPU 60 receives the write command WCd1 from the host 100 or the like, the track TRm−2 can be changed from a correctable track to an uncorrectable track because the MPU 60 performs a write process for one track or less on the track TRm−2. The MPU 60 thus saves uncorrectable command data corresponding to the track TRm−2 of the write command WCd1 and the track TRm−2 in a cache, such as the system area 10b of the disk 10, volatile memory 70, nonvolatile memory 80 and buffer memory 90, and does not perform a write process for the track TRm−2. In other words, the MPU 60 saves uncorrectable command data (update data) from the circumferential position CP4 to the circumferential position CPR on the track TRm−2 and the track TRm−2 in a cache, such as the system area 10b of the disk 10, volatile memory 70, nonvolatile memory 80 and the buffer memory 90, and does not perform a write process for the track TRm−2.

When the MPU 60 saves uncorrectable command data (update data) corresponding to the track TRm−2 of the write command WCd1 and the track TRm−2 are saved in a cache, it performs a read modify write process for the track TRm−2 based on the uncorrectable command data (update data) and the track TRm−2 during idle time. In other words, when the MPU 60 saves uncorrectable command data (update data) from the circumferential position CP4 to the circumferential position CPR on the track TRm−2 and the track TRm−2 in a cache, it performs a read modify write process for the track TRm−2 based on the uncorrectable command data (update data) and the track TRm−2 during idle time.

When the MPU 60 saves uncorrectable command data corresponding to the track TRm−2 of the write command WCd1 and the track TRm−2 in a cache and receives the write command WCd2 from the host 100 or the like, it writes the uncorrectable command data and the write command WCd2 to the track TRm−1. In other words, when the MPU 60 saves uncorrectable command data (update data) from the circumferential position CP4 to the circumferential position CPR on the track TRm−2 and the track TRm−2 in a cache and receives the write command WCd2 from the host 100 or the like, it writes the uncorrectable command data (update data) and the write command WCd2 to the track TRm−1.

In the example shown in FIG. 17, when the MPU 60 receives the write command WCd1 from the host 100 or the like, the track TRm+2 can be changed from a correctable track to an uncorrectable track because the MPU 60 performs a write process for one track or less in the track TRm+2. The MPU 60 thus saves uncorrectable command data corresponding to the track TRm+2 of the write command WCd1 and the track TRm+2 in a cache, such as the disk 10, volatile memory 70, nonvolatile memory 80 and the buffer memory 90, and does not perform a write process for the track TRm+2. In other words, the MPU 60 saves uncorrectable command data from the circumferential position CPS to the circumferential position CP3 on the track TRm+2 and the track TRm+2 in a cache, such as the disk 10, volatile memory 70, nonvolatile memory 80 and buffer memory 90, and does not perform a write process for the track TRm+2.

When the MPU 60 saves uncorrectable command data (update data) corresponding to the track TRm+2 of the write command WCd1 and the track TRm+2 are saved in a cache, it performs a read modify write process for the track TRm−2 during idle time based on the uncorrectable command data (update data) and the track TRm+2. In other words, when the MPU 60 saves uncorrectable command data (update data) from the circumferential position CPS to the circumferential position CP3 of the track TRm+2 and the track TRm+2 in a cache, it performs a read modify write process for the track TRm−2 based on the uncorrectable command data (update data) and the track TRm+2 during idle time.

When the MPU 60 saves uncorrectable command data corresponding to the track TRm+2 of the write command WCd1 and the track TRm+2 in a cache and receives the write command WCd3 from the host 100 or the like, it writes the uncorrectable command data and the write command WCd3 to the track TRm+2. In other words, when the MPU 60 saves uncorrectable command data from the circumferential position CPS to the circumferential position CP3 and the track TRm+2 on the track TRm+2 in a cache and receives the write command WCd3 from the host 100 or the like, it writes the uncorrectable command data and the write command WCd3 to the track TRm+2.

FIG. 18 is a flowchart showing an example of the saving process according to the second modification.

The MPU 60 receives a write command to write data to a predetermined correctable area of the user data area 10a, such as a correctable track (B1801). The MPU 60 determines whether a correctable area corresponding to the write command, such as a correctable track, becomes an uncorrectable area when data is written in accordance with the write command (B1802). In other words, the MPU 60 determines whether a command received from the host 100 is an uncorrectable command or not. When the MPU 60 determines that the correctable area does not become an uncorrectable area, such as an uncorrectable track (No in B1802), it writes data corresponding to the write command to a predetermined correctable area of the user data area 10a, such as a correctable track (B1803), and ends the process.

When the MPU 60 determines that the correctable area becomes an uncorrectable area, such as an uncorrectable track (Yes in B1802), it determines whether the cache includes a free area (B1804). When the MPU 60 determines that the cache includes no free area (No in B1804), it proceeds to the process of B1803.

When the MPU 60 determines that the cache includes a free area (Yes in B1804), the MPU 60 saves data (uncorrectable command data) corresponding to the write command (uncorrectable command) and data (uncorrectable scheduled data) of a correctable track (uncorrectable scheduled track) in the user data area 10a corresponding to the uncorrectable command) in a cache (B1805), and ends the process.

FIG. 19 is a flowchart showing an example of the saving process according to the second modification.

The MPU 60 receives a write command to write data to a predetermined track on the user data area 10a (B1801). The MPU 60 determines whether a write process in which an error cannot be corrected per track, such as a sequential write process to the middle of one track, or a random write process, is permitted for a track corresponding to the write command (B1901). When the MPU 60 determines that a random write process is permitted for the track (No in B1901), the MPU 60 writes data corresponding to the write command to the track on the user data area 10a (B1803), and ends the process.

When the MPU 60 determines that the random write process is not permitted for the track (Yes in B1901), the MPU 60 determines whether the cache includes a free area (B1804). When the MPU 60 determines that the cache includes no free area (No in B1804), it proceeds to the process of B1803.

When the MPU 60 determines that the cache includes a free area (Yes in B1804), the MPU 60 saves data corresponding to the write command and data of a track on the user data area 10a corresponding to the command in the cache (B1805), and ends the process.

According to the second modification, when the magnetic disk device 1 receives an inhibit area write command from the host 100 or the like, it determines whether another recording area includes a free area. When the magnetic disk device 1 determines that another recording area includes a free area, it saves inhibit area command data corresponding to the inhibit area write command and random write inhibit data in another recording area, and does not execute the inhibit area write command. When the magnetic disk device 1 determines that another recording area includes no free area, it writes inhibit area command data corresponding to the inhibit area write command to a random write inhibit track.

In addition, when the magnetic disk device 1 receives an uncorrectable command from the host 100 or the like, it determines whether another recording area includes a free area. When the magnetic disk device 1 determines that another recording area includes a free area, it saves uncorrectable command data corresponding to the uncorrectable command and uncorrectable scheduled data in another recording area, and does not execute the uncorrectable command. When the magnetic disk device 1 determines that another recording area includes no free area, it writes uncorrectable command data corresponding to the uncorrectable command to an uncorrectable scheduled track.

Since the DOL for a track that cannot be subjected to a track ECC process is set to a strict value, write fault is likely to occur to lower write performance. Since, furthermore, the write number for a track that cannot be subjected to a track ECC process may be set small, a refresh process has to be performed frequently to lower write performance. In the second modification, when the magnetic disk device receives a write command, it temporarily saves data corresponding to the write command in a cache, and performs a process of changing a track that cannot be subjected to a track ECC process to a track that can be subjected to a track ECC process. The magnetic disk device 1 can thus perform a write process with efficiency. That is, the magnetic disk device 1 can be improved in its write performance. Therefore, the magnetic disk device 1 can be improved in its reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head which writes data to the disk and reads data from the disk;
   a first sector group including one or more first sectors and a first parity sector, the first sectors which allow an error correction process to be performed for each track based on the first parity sector, and are continuously arranged in a circumferential direction of the disk from the first parity sector; and
   a second sector group including one or more second sectors which allow no error correction process to be performed for each track, and are continuously arranged in the circumferential direction.

2. The magnetic disk device of claim 1, wherein different read processes are applied to the first sector group and the second sector group.

3. The magnetic disk device of claim 2, wherein when an error sector in the first sector group is detected, if the error sector cannot be corrected by a sector ECC process, a track ECC process is performed for the error sector based on the first parity sector to correct the error sector.

4. The magnetic disk device of claim 2, wherein when an error sector in the first sector group is detected, if the error sector cannot be corrected by a read retry, a track ECC process is performed for the error sector based on the first parity sector to correct the error sector.

5. The magnetic disk device of claim 2, wherein when an error sector in the second sector group is detected, if the error sector cannot be corrected by a sector ECC process, a track ECC process is not performed for the error sector based on the first parity sector.

6. The magnetic disk device of claim 2, wherein when an error sector in the second sector group is detected, if the error sector cannot be corrected by a read retry, a track ECC process is not performed for the error sector based on the first parity sector.

7. The magnetic disk device of claim 1, wherein when a sector group belonging to a first write command contains the first parity sector, the sector group is managed as a sector group where a track ECC process is performed.

8. The magnetic disk device of claim 1, wherein when a sector group belonging to a second write command does not contain the first parity sector, the sector group is managed as a sector group where a track ECC process is not performed.

* * * * *